(12) United States Patent
Ovrutsky et al.

(10) Patent No.: US 10,409,041 B2
(45) Date of Patent: Sep. 10, 2019

(54) TIR IMAGING LENS, IMAGE CAPTURING SYSTEM HAVING THE SAME, AND ASSOCIATED METHODS

(71) Applicant: FLIR SYSTEMS, INC., Wilsonville, OR (US)

(72) Inventors: David Ovrutsky, Charlotte, NC (US); Jeremy Huddleston, Oviedo, FL (US); Paul Elliott, Charlotte, NC (US); David Keller, Charlotte, NC (US); Richard Jones, Charlotte, NC (US); Thomas Mercier, Charlotte, NC (US)

(73) Assignee: FLIR SYSTEMS, INC., Wilsonville, OR (US)

( * ) Notice: Subject to any disclaimer, the term of this patent is extended or adjusted under 35 U.S.C. 154(b) by 0 days.

(21) Appl. No.: 15/933,014

(22) Filed: Mar. 22, 2018

(65) Prior Publication Data

US 2018/0292632 A1    Oct. 11, 2018

Related U.S. Application Data

(60) Division of application No. 14/589,305, filed on Jan. 5, 2015, now abandoned, which is a
(Continued)

(51) Int. Cl.
| | |
|---|---|
| G02B 13/14 | (2006.01) |
| G02B 3/00 | (2006.01) |
| H04N 5/33 | (2006.01) |
| H04N 5/225 | (2006.01) |
| G02B 13/22 | (2006.01) |

(52) U.S. Cl.
CPC ............ *G02B 13/14* (2013.01); *G02B 13/22* (2013.01); *H04N 5/2257* (2013.01); *H04N 5/33* (2013.01)

(58) Field of Classification Search
None
See application file for complete search history.

(56) References Cited

U.S. PATENT DOCUMENTS

| | | |
|---|---|---|
| 3,160,700 A | 12/1964 | Snyder |
| 4,419,182 A | 12/1983 | Westerberg |

(Continued)

FOREIGN PATENT DOCUMENTS

| | | |
|---|---|---|
| CN | 1576941 A | 2/2005 |
| CN | 101387737 A | 3/2009 |

(Continued)

OTHER PUBLICATIONS

Curatu, George, "Design and fabrication of low-cost thermal imaging optics using precision chalcogenide glass molding", SPIE Proceedings, vol. 7060, Aug. 29, 2008.

(Continued)

*Primary Examiner* — Shamim Ahmed
(74) *Attorney, Agent, or Firm* — Lee & Morse, P.C.

(57) ABSTRACT

A method of manufacturing lenses includes creating a wafer-level master, overmolding the wafer-level master to form a daughter replica, casting a polymer lens shapes onto a wafer using the daughter replica, transferring the polymer lens shapes into the wafer, and singulating the wafer to create individual dies with a lens thereon. The wafer may be silicon, e.g., silicon having a resistivity between 0.1 and 100 Ωcm.

25 Claims, 14 Drawing Sheets

Related U.S. Application Data continuation-in-part of application No. 13/835,188, filed on Mar. 15, 2013, now abandoned, which is a continuation-in-part of application No. 13/356,211, filed on Jan. 23, 2012, now Pat. No. 9,348,120.

(60) Provisional application No. 61/923,973, filed on Jan. 6, 2014.

(56) References Cited

U.S. PATENT DOCUMENTS

| | | | |
|---|---|---|---|
| 4,482,443 A | 11/1984 | Bacon et al. | |
| 4,537,464 A | 8/1985 | Boutellier | |
| 4,827,130 A | 5/1989 | Reno | |
| 5,833,596 A | 11/1998 | Bonnell et al. | |
| 6,027,595 A * | 2/2000 | Suleski | B82Y 10/00 156/230 |
| 6,535,332 B1 | 3/2003 | Nakano et al. | |
| 6,999,243 B2 | 2/2006 | Chipper | |
| 7,863,570 B2 | 1/2011 | Myers et al. | |
| 8,044,355 B2 | 10/2011 | Gibbons et al. | |
| 9,348,120 B2 | 5/2016 | Huddleston | |
| 2002/0148560 A1 | 10/2002 | Carr | |
| 2003/0117482 A1 | 6/2003 | Border et al. | |
| 2004/0218284 A1 | 11/2004 | Chen et al. | |
| 2005/0018314 A1 | 1/2005 | Yamaguchi et al. | |
| 2005/0110104 A1* | 5/2005 | Boettiger | B29D 11/00375 257/432 |
| 2006/0016995 A1 | 1/2006 | Kummer et al. | |
| 2008/0314436 A1* | 12/2008 | O'Connell | H01L 31/02167 136/246 |
| 2009/0224156 A1 | 9/2009 | Gibbons et al. | |
| 2012/0099848 A1* | 4/2012 | Shabtay | G02B 17/08 396/322 |
| 2012/0113504 A1 | 5/2012 | Tanami et al. | |
| 2012/0176668 A1 | 7/2012 | Saito et al. | |
| 2012/0188635 A1 | 7/2012 | Kubala et al. | |
| 2012/0229892 A1 | 9/2012 | Kang et al. | |
| 2013/0076900 A1 | 3/2013 | Mrozek et al. | |
| 2013/0208353 A1 | 8/2013 | Huddleston | |
| 2013/0293970 A1 | 11/2013 | Qiu et al. | |

FOREIGN PATENT DOCUMENTS

| | | |
|---|---|---|
| CN | 102466861 A | 5/2012 |
| EP | 1077386 A1 | 2/2001 |
| EP | 2034344 A2 | 3/2009 |
| EP | 2034344 A3 | 3/2009 |
| JP | 2005-077556 A | 3/2005 |
| WO | WO 2012/100405 A1 | 8/2012 |

OTHER PUBLICATIONS

Thurber, et al., "Semiconductor Measurement Technology: The Relationship Between Resistivity and Dopant Density for Phosphorus and Boron-Doped Silicon", 1981.

Edmund Optics, "Understanding Optical Specifications", https://www.edmundoptics.com/resources/application-notes/optics/understanding-optical-specifications/ printed Jun. 2017.

U.S. Office Action for U.S. Appl. No. 13/835,188 dated Feb. 2, 2016; Huddleston.

Chinese Office action dated Mar. 11, 2016 for CN 2013800153157; Huddleston.

Office Action issued for U.S. Appl. No. 15/161,791 dated Mar. 9, 2017.

U.S. Office Action for U.S. Appl. No. 13/356,211 dated Apr. 15, 2015; Huddleston.

U.S. Office Action for U.S. Appl. No. 13/835,188 dated May 21, 2015; Huddleston.

PCT International Search Report dated Jan. 22, 2013.

USPTO Office action dated Jul. 16, 2019 in U.S. Appl. No. 15/870,377, Jeremy Huddleston.

\* cited by examiner

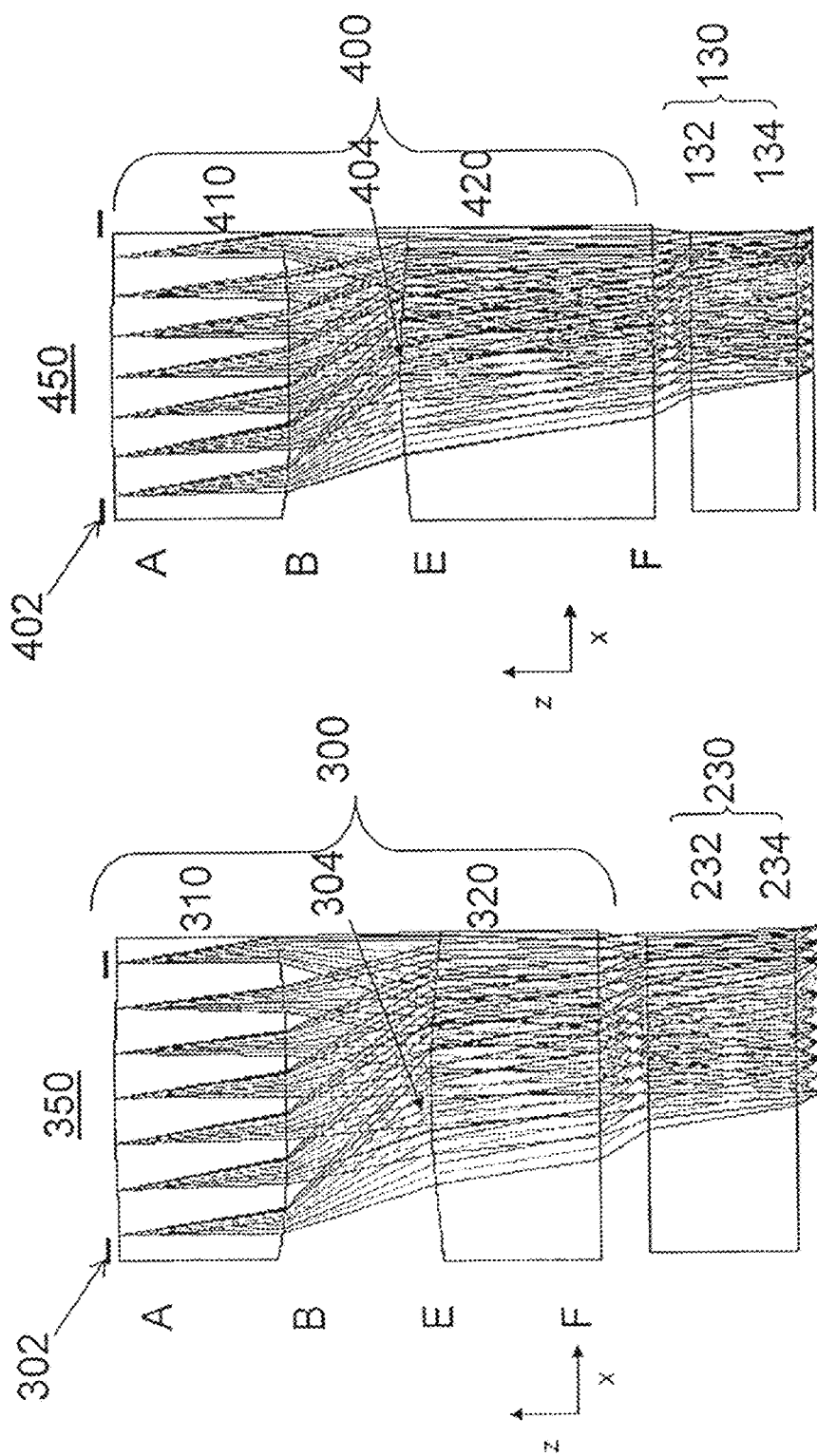

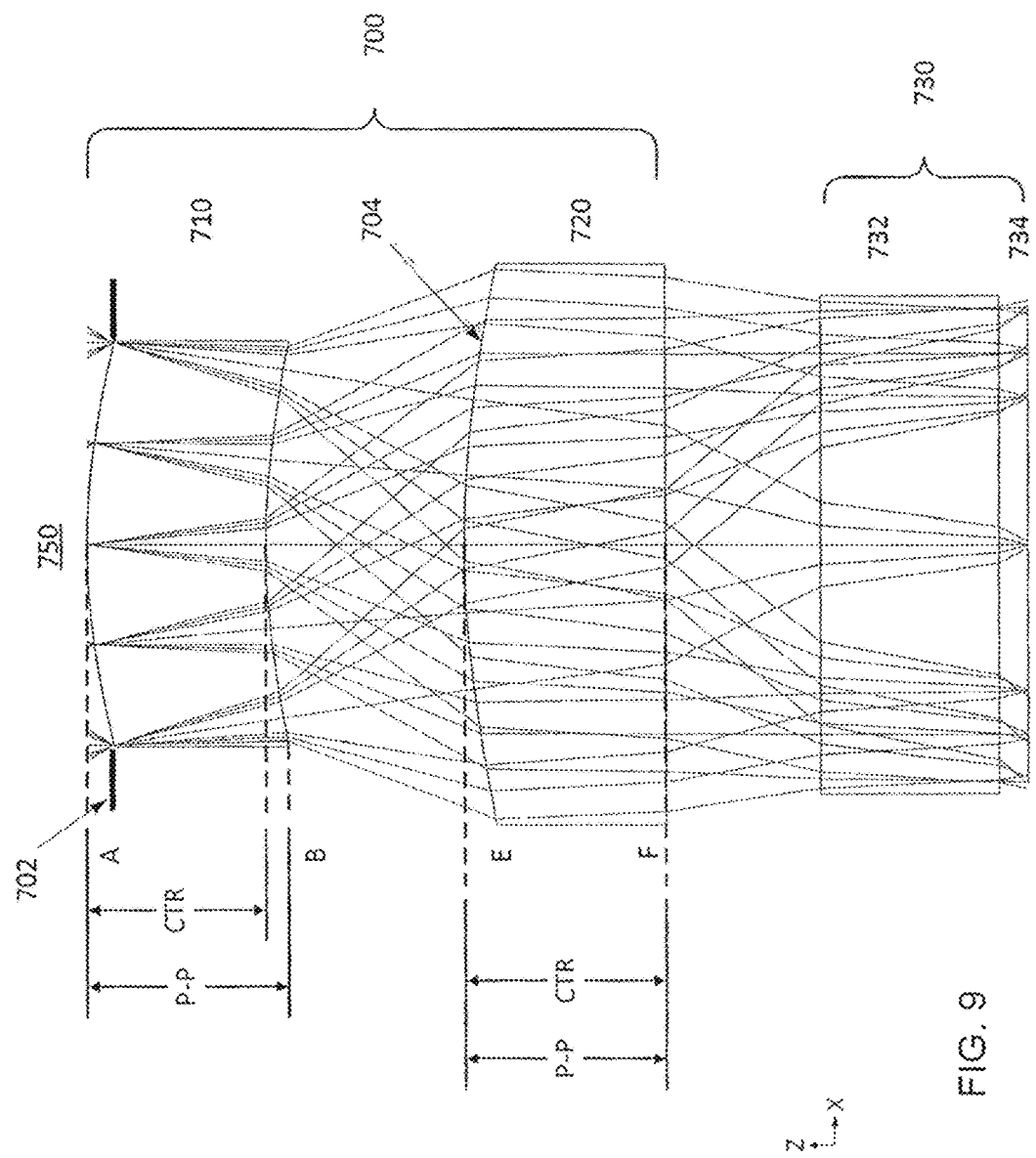

TIR IMAGING LENS, IMAGE CAPTURING SYSTEM HAVING THE SAME, AND ASSOCIATED METHODS

CROSS-REFERENCE TO RELATED APPLICATIONS

This is a divisional application based on pending application Ser. No. 14/589,305, filed Jan. 5, 2015, the '305 application being a Continuation-in-Part application of U.S. patent application Ser. No. 13/835,188, filed in the U.S. Patent and Trademark Office on Mar. 15, 2013, and entitled "LWIR Imaging Lens, Image Capturing System Having the Same, and Associated Methods," which is a Continuation-in-Part application of pending U.S. patent application Ser. No. 13/356,211, filed in the U.S. Patent and Trademark Office on Jan. 23, 2012, and entitled "LWIR Imaging Lens, Image Capturing System Having the Same," which are all incorporated herein by reference in their entirety.

The present application claims priority under 35 U.S.C. § 119(e) to U.S. Provisional Application No. 61/923,973, filed on Jan. 6, 2014, and entitled: "LWIR Imaging Lens, Image Capturing System Having the Same, And Associated Methods,"

BACKGROUND OF THE INVENTION

1. Field of the Invention

Embodiments relate to an imaging lens for the thermal infrared (TIR) region (mid-wavelength infrared (MWIR) and long wavelength infrared (LWIR) region), an image capturing system including the same, and associated methods.

2. Description of the Related Art

As with most technology, there is a demand for smaller and cheaper thermal imagers, whether as stand alone devices or integrated into mobile devices, electronic device, and so forth.

SUMMARY OF THE INVENTION

One or more embodiments is directed to an imaging lens for use with an operational waveband over any subset of 2-13.5 μm, the imaging lens including a silicon element having an image side surface and an object side surface, at least one of the image side and object side surfaces being an optically powered surface with a lens having a surface finish with a roughness of less than 20 nm Ra.

The optically powered surface may include a blend region beyond a clear aperture of the lens, the blend region terminating at a flat region.

The flat region is higher than a lowest point of the lens.

The flat region may be higher than a lowest point of the blend region.

The silicon element is non-circular, e.g., polygonal.

The silicon element may include die features on at least one of the image side and object side surfaces.

The die features may include at least one of a die alignment mark, a wafer alignment mark, and a die identifier.

The imaging lens may include an optical element having an image side surface and an object side surface, at least one of the image side and object side surfaces being an optically powered surface.

The optical element is silicon.

The optical element may be non-circular.

The silicon element may have a resistivity between 0.1 and 100 Ωcm, e.g., between 1 and 3.5 Ωcm.

The silicon element may be n-type silicon.

The optically powered surface is aspheric.

One or more embodiments is directed a method of manufacturing lenses, the method including creating a wafer-level master, overmolding the wafer-level master to form a daughter replica, casting a polymer lens shapes onto a wafer using the daughter replica, transferring the polymer lens shapes into the wafer, and singulating the wafer to create individual dies with a lens thereon.

Creating the wafer-level master may include machining a metal substrate.

Machining may include diamond turning.

Creating the wafer-level master includes machining perturbed lens shapes into the wafer-level master such that the transferred lens shape in silicon best meets a desired lens shape.

The method may include, before singulating, forming die features on the wafer, at least one die feature being on the individual die.

The die features may include at least one of a die alignment mark, a wafer alignment mark, and a die identifier.

Before casting the polymer lens shapes, die features may be patterned in photoresist on a surface of the wafer to have polymer lens shapes cast thereon.

The method may include transferring the die features into the wafer.

Transferring the die features occurs during transferring the polymer lens shapes.

The method may include, after casting the polymer lens shapes and before transferring, patterning die features on a surface of the wafer having the polymer lens shapes thereon.

Patterning may include depositing a hard mask on the surface of the wafer; and patterning the hard mask.

Patterning may include providing a photoresist pattern on the hard mask and etching the hard mask.

The method may include removing polymer while not affecting the hard mask until the wafer is exposed.

The method may include removing the hard mask and the photoresist.

Singulating may include etching.

After transferring but before singulating, a coating, e.g., an antireflective coating or a short wave cut filter, may be provided on the wafer on one or both surfaces of the wafer.

The method may include, after providing the coating and before singulating, forming aperture stops on the lenses.

Forming aperture stops may include patterning chrome.

The method may include, before casting, measuring a resistivity of the wafer.

The method may be continued when the wafer has a resistivity between 0.1 and 100 Ωm, e.g., between 1 and 10 Ωm.

The wafer may be a silicon wafer.

The method may include, before singulating, forming aperture stops on the lenses.

Singulating creates circular or non-circular dies.

One or more embodiments is directed an imaging lens for use with an operational waveband over any subset of 2-13.5 μm, the imaging lens including a silicon element having an image side surface and an object side surface, at least one of the image side and object side surfaces being an optically powered surface, the silicon element having a resistivity between 0.1 and 100 Ωcm, e.g., between 1 and 10 Ωcm.

One or more embodiments is directed an imaging system for use with an operational waveband over any subset of 2-13.5 µm, the imaging system including a sensor; and a silicon element having an image side surface and an object side surface, at least one of the image side and object side surfaces being an optically powered surface, the silicon element having a resistivity between 0.1 and 100 Ωcm.

The imaging system may include a non-silicon element having an image side surface and an object side surface, at least one of the image side and object side surfaces being an optically powered surface.

BRIEF DESCRIPTION OF THE DRAWINGS

Features and advantages will become more apparent to those of skill in the art by describing in detail exemplary embodiments with reference to the attached drawings, in which:

FIG. 4 illustrates a schematic side view of an image capturing system in accordance with an embodiment;

FIG. 5 illustrates a schematic side view of an image capturing system in accordance with an embodiment;

FIG. 9 illustrates a schematic side view of an image capturing system in accordance with an embodiment;

FIGS. 14A and 4B illustrate perspective views of lens dies according to embodiments.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete.

In designing thermal infrared sensors, also known as thermal imagers, materials for use as thermal lenses typically have high transmission in the TWIR region, e.g., in the MWIR waveband of 2-7.5 µm and in the LWIR waveband of 7.5-13.5 µm. Current typical materials for thermal lenses include germanium (Ge), chalcogenide glass, zinc selenide (ZnSe), and zinc sulfide (ZnS). However, many optical materials having other desirable properties are excluded due to a high absorption in the waveband of 2-13.5 µm. While some optical materials have been used for thermal applications, e.g., a thermopile, these applications do not include thermal imaging, e.g., 30×30 resolution or higher.

As described in detail below, as designs for thermal imagers shrink, e.g., for use in mobile devices, a thickness of material used for thermal lenses may decrease sufficiently to allow materials that are typically considered too absorptive in the TWIR waveband, especially in the LWIR waveband, to be used as thermal lenses. This allows the use of other materials, e.g., silicon, that have an absorption band at about 9 microns in the LWIR waveband, but offer other advantages, e.g., manufacturability, low coefficient of thermal expansion, low dispersion, etc., to be employed.

The imaging lenses discussed in detail below are to be operational over any subset of the TIR waveband. These imaging lenses are designed to be made in a high index material, i.e., greater than 2.2, having an absorption per mm of thickness less than 75% in the operational waveband, and an absorption per mm of thickness greater than 75% in a visible waveband of 400-650 nm. While silicon meets these parameters and provides advantages noted above, other materials that meet these parameters may also be used.

Figure 1:
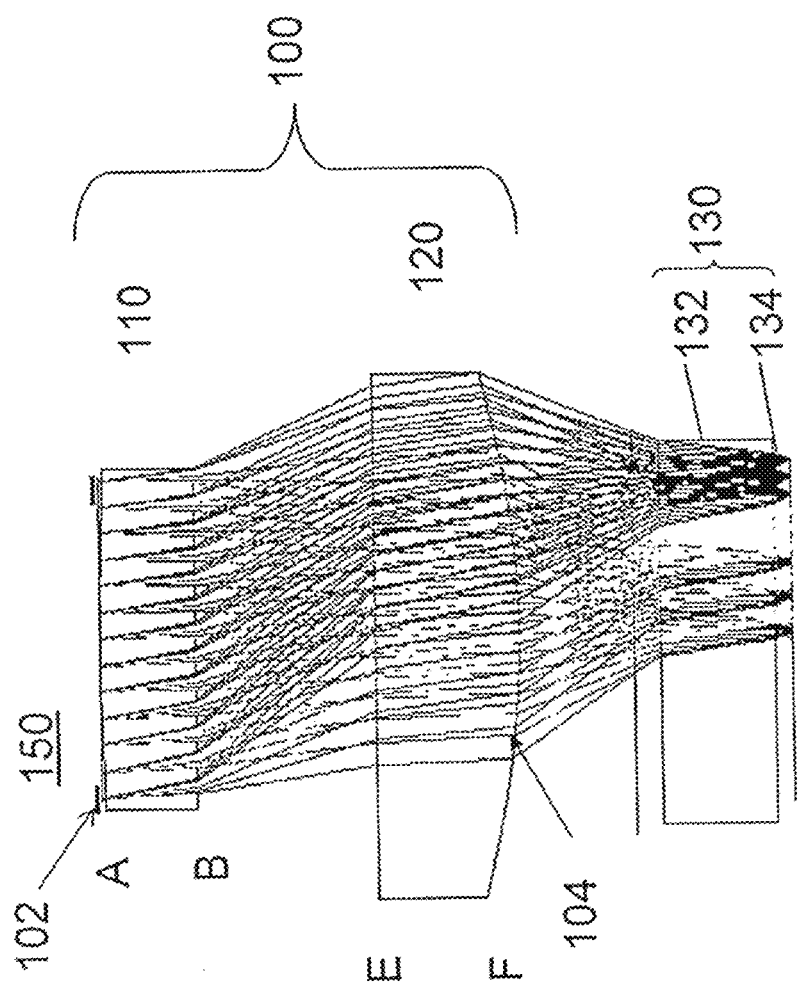
FIG. 1 illustrates a schematic side view of an imaging capturing system in accordance with an embodiment.

FIG. 1 illustrates a schematic side view of an image capturing system 150 in the TIR waveband in accordance with an embodiment. As illustrated in FIG. 1, the image capturing system 150 includes an imaging lens 100 and a sensor 130.

The imaging lens 100 may include a first optical element 110 and a second optical element 120. In the schematic illustration of FIG. 1, a spacer (which would include surfaces C and D, see FIG. 6) between the first optical element 110 and the second optical element 120 has been omitted for clarity.

In this particular embodiment, both the first optical element 110 and the second optical element 120 are planoconvex lenses. A surface A, here an input surface of the imaging lens 100, of the first optical element 110 and a surface F, here a final surface of the imaging lens 100, both have optical power. One or both of these surfaces may be aspheric. Surface B of the first optical element 110 and surface E of the second optical element 120 have no optical power, here are both planar, and face each other.

The imaging lens 100 may also include an aperture stop 102. For example, the aperture stop 102 may be adjacent surface A, e.g., directly on surface A, of the first optical element 110. The aperture stop 102 may be made of metal, e.g., chromium, a dyed polymer, or any suitable material that is opaque to TIR. The aperture stop 102 may be at any appropriate location within the imaging lens 100. The aperture stop 102 may be thin, but thick enough, e.g., greater than around 200 nm, to be effective, i.e., have a transmission therethrough of less than about 0.5% in the operational waveband. The f-number for the imaging lens 100 may be less than 1.1.

If the material used for one or both optical elements 110, 120 presents chromatic dispersion over an operational waveband or if the imaging lens 100 otherwise requires correction, a diffractive element 104 may be provided on one or more of the surfaces A, B, E, or F. For example, the diffractive element 104 may be on the surface having the most optical power, here, surface F.

The sensor 130 may include a sensor cover glass 132 and pixels in a sensor image plane 134, the pixels detecting TIR radiation. The sensor cover glass 132 may be made of silicon and may have a thickness between 0.5 mm and 1.0 mm. The working distance of the image capturing system 150 is a distance from a bottom surface, i.e., an apex of the bottom surface, of the imaging lens 100, here surface F, to a top surface of the cover glass 132. The optical track length of the imaging capturing system 150 is a distance from an apex of the first surface of the imaging lens 100, here surface A, to the sensor image plane 134.

While the above embodiment provides a design in which only two surfaces have optical power for the imaging lens 100 along the z-direction, the maximum clear aperture of the imaging lens 100 (here at surface F) is much larger, e.g., more than 50% greater, than the sensor image diagonal, i.e., a diagonal across the sensor image plane 134, and the maximum SAG of the imaging lens 100 (also at surface F) is relatively large, e.g., much greater than 100 µm. In the particular design illustrated in FIG. 1, the maximum clear aperture is 2.6 mm, the sensor image diagonal is 1.7 mm, and the maximum SAG is 203 µm.

However, having the maximum clear aperture being much larger than the sensor image diagonal and having a large maximum SAG may present manufacturability and cost issues, particularly when these optical elements are to be made on a wafer level, as described later. Without reference to a particular sensor, i.e., the sensor image diagonal, the maximum clear aperture may be defined relative to an image circle of the lens. In particular, the image circle of the lens is to be understood as the diameter of the image produced at the focal plane of the lens corresponding to a given field of view (FOV), e.g., 55 degrees or greater, of the lens. In the context of an imaging system having an imaging lens and an image sensor, the image circle is understood to be the largest distance across the image that is used by the image sensor, typically the image sensor diagonal of the sensor with which the imaging lens used or intended to be used.

Therefore, embodiments illustrated in FIGS. 2 to 5 may employ a two optical element design in which optical power is provided on three surfaces. Spreading the optical power over three surfaces, while increasing the number of surfaces to be manufactured, allows a maximum clear aperture much closer in size to the sensor image diagonal (or image circle) and a reduced SAG to be realized. In embodiments, the maximum clear aperture of the imaging lens may be less than 30% greater, e.g., less than 20% greater, than the sensor image diagonal or the image circle corresponding to a FOV of 55 degrees or greater.

Figure 2:
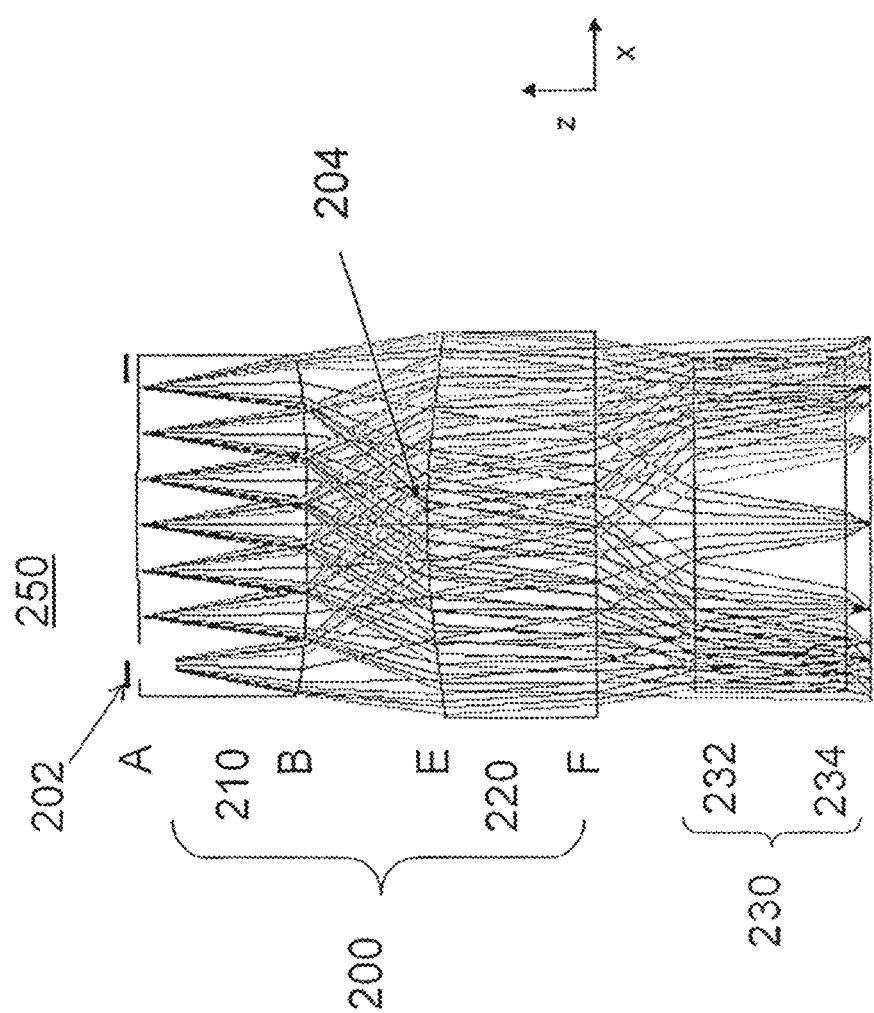
FIG. 2 illustrates a schematic side view of an imaging capturing system in accordance with an embodiment.

FIG. 2 illustrates a schematic side view of an imaging capturing system 250 in the TIR waveband in accordance with an embodiment. As illustrated in FIG. 2, the image capturing system 250 includes an imaging lens 200 and a sensor 230.

The imaging lens 200 may include a first optical element 210 and a second optical element 220. In the schematic illustration of FIG. 2, a spacer (which would include surfaces C and D, see FIG. 6) provides an air gap between the first optical element 210 and the second optical element 220 has been omitted for clarity. Features outside the optical surfaces could be used to nest them together, e.g., the air gap may be provided by a barrel or housing.

In this particular embodiment, three surfaces, here surfaces A, B, and E, have optical power therein. One, two, or all three surfaces may be aspheric. All three surfaces may have a positive power at the apex thereof, i.e., may be convex at the apex thereof. The imaging lens 200 may also include the aperture stop 202, which may have the same configuration/properties noted above for aperture stop 102. The f-number for the imaging lens 200 may be less than 1.1.

If the material used for one or both optical elements 210, 220 presents chromatic dispersion over an operational waveband or if the imaging lens 200 otherwise requires correction, a diffractive element 204 may be provided on one or more of the surfaces A, B, E, or F. For example, the diffractive element 204 may be on the surface having the most optical power, here, surface E.

The sensor 230 may include a sensor cover glass 232 and pixels in a sensor image plane 234, the pixels detecting TIR radiation. In the particular configuration, the sensor image diagonal may be about 1.443 mm.

Figure 3A:
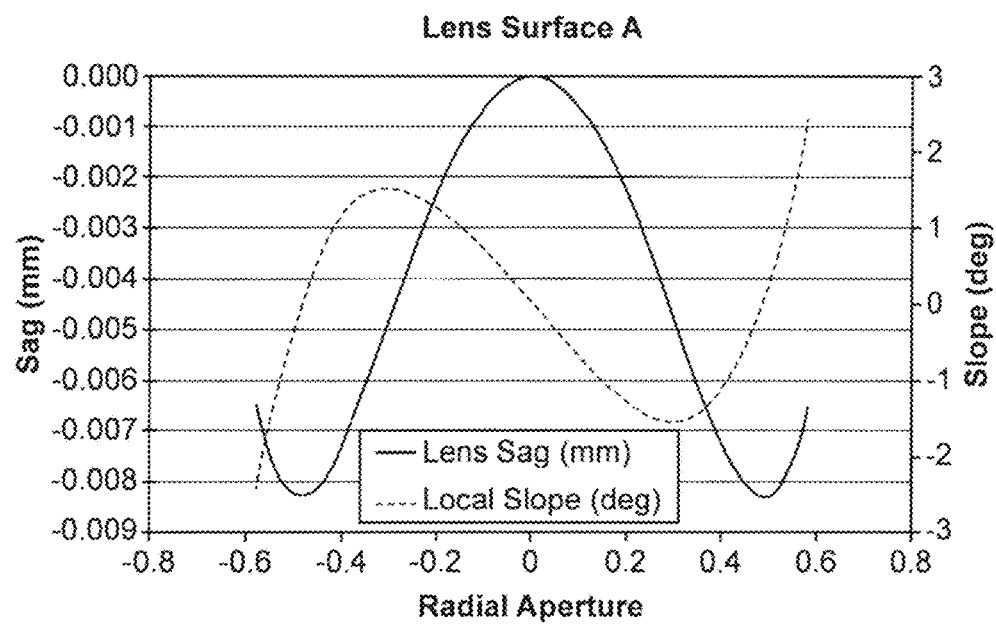
FIGS. 3A to 3C illustrate plots of lens sag and slope versus radial aperture for lens surfaces having power therein in FIG. 2.
Figure 3B:
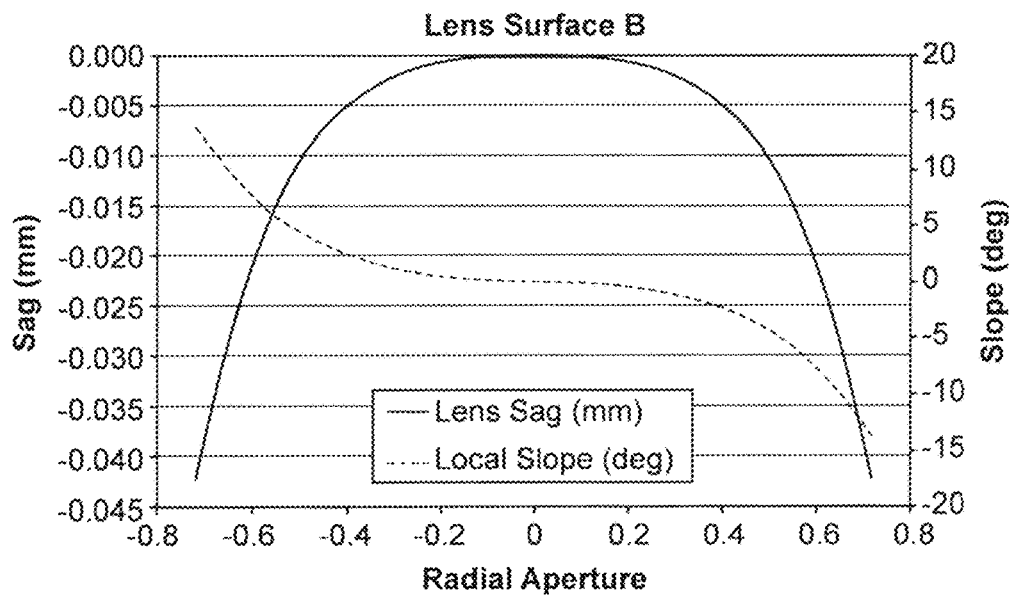
Figure 3C:
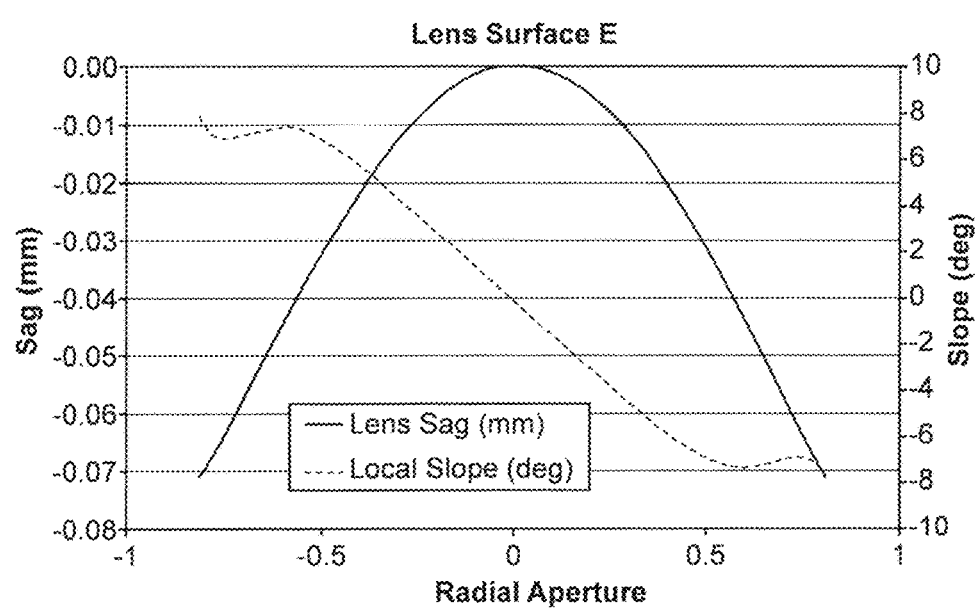

FIGS. 3A to 3C illustrate plots of lens sag and slope versus radial aperture for lens surfaces A, B, and E of FIG. 2.

As can be seen in FIG. 3A, surface A is a gullwing surface, i.e., has a convex apex and a concave edge. For surface A, the clear aperture is 1.159 mm and the SAG over the clear aperture is 0.008 mm (8 µm).

As can be seen in FIG. 3B, surface B is a convex surface. For surface B, the clear aperture is 1.433 mm and the SAG over the clear aperture is 0.042 mm (42 µm).

As can be seen in FIG. 3C, surface E is a convex surface. For surface E, the clear aperture is 1.613 mm and the SAG over the clear aperture is 0.071 mm (71 µm).

Thus, for the imaging lens 200, the maximum clear aperture is 1.613 mm, i.e., less than 30% greater than the sensor image diagonal (or the image circle), and the maximum SAG is 71 µm, i.e., less than 100 µm.

Further, by having small SAGs, if a starting thickness, i.e., before forming the lens surface, of the optical elements 210, 220 is the same, then the center thickness of the optical elements 210, 220 may be within 15% of one another. In this particular example, the optical element 210 has a center thickness of 0.68 mm and the optical element 220 has a center thickness of 0.69 mm. For example, when made on a wafer level, a starting thickness of substrates used to create the optical elements 210, 220, may be between 0.5 mm and 1.5 mm, e.g., 0.5 mm to 1.0 mm, with this particular example having a starting thickness of 0.7 mm. Using the same or standard substrate thickness, particularly thinner substrates, may reduce cost.

Further, in this particular example, the second optical element 220 is closer to the cover glass 132 than to the first optical element 210, with a difference between these distances, i.e., B to E and F to 132, being less than 50%. In this particular example, the optical track length is 3 and a ratio of the optical track length to the image diagonal of the sensor is less than 2.5.

FIG. 4 illustrates a schematic side view of an imaging capturing system 350 in the TIR waveband in accordance with an embodiment. As illustrated in FIG. 4, the image capturing system 350 includes an imaging lens 300 and the sensor 230.

The imaging lens 300 may include a first optical element 310 and a second optical element 320. In the schematic illustration of FIG. 4, a spacer (which would include surfaces C and D, see FIG. 6) between the first optical element 310 and the second optical element 320 has been omitted for clarity.

In this particular embodiment, three surfaces, here surfaces A, B, and E, have optical power therein. One, two, or all three surfaces may be aspheric. The imaging lens 300 may also include the aperture stop 302, which may have the same configuration/properties noted above for aperture stop 102. The f-number for the imaging lens 300 may be less than 1.1.

If the material used for one or both optical elements 310, 320 presents chromatic dispersion over an operational waveband or if the imaging lens 300 otherwise requires correction, a diffractive element 304 may be provided on one or more of the surfaces A, B, E, or F. For example, the diffractive element 304 may be on the surface having the most optical power, here, surface E.

For the imaging lens 300, surface A is a gullwing surface having a clear aperture of 1.167 mm and SAG over the clear aperture of 0.017 mm (17 µm); surface B is a convex surface having a clear aperture of 1.398 mm and SAG over the clear aperture is 0.039 mm (39 µm); surface E is a gullwing surface having a clear aperture of 1.444 mm and SAG over the clear aperture is 0.046 mm (46 µm).

Thus, for the imaging lens 300, the maximum clear aperture is 1.444 mm, i.e., less than 30% greater than the sensor image diagonal (or the image circle), and the maximum SAG is 46 µm, i.e., less than 100 µm. Further, in this particular example, the second optical element 320 is closer to the cover glass 232 than to the first optical element 310, with a difference between these distances, i.e., B to E and F to 232, being greater than 50%.

FIG. 5 illustrates a schematic side view of an imaging capturing system 450 in the TIR waveband in accordance with an embodiment. As illustrated in FIG. 5, the image capturing system 450 includes an imaging lens 400 and the sensor 130. The image capturing system 450 is designed for a longer optical track length than the embodiments of FIGS. 2 and 4, so the imaging lens 400 is of a slightly larger scale, with a thickness of the first optical element 410 being 1.019 mm and a thickness of the second optical element 420 being 1.488 mm.

The imaging lens 400 may include a first optical element 410 and a second optical element 420. In the schematic illustration of FIG. 5, a spacer (which would include surfaces C and D, see FIG. 6) between the first optical element 410 and the second optical element 420 has been omitted for clarity.

In this particular embodiment, three surfaces, here surfaces A, B, and E, have optical power therein. One, two, or all three surfaces may be aspheric. The imaging lens 400 may also include the aperture stop 402, which may have the same configuration/properties noted above for aperture stop 102. The f-number for the imaging lens 400 may be less than 1.1.

If the material used for one or both optical elements 410, 420 presents chromatic dispersion over an operational waveband or if the imaging lens 400 otherwise requires correction, a diffractive element 404 may be provided on one or more of the surfaces A, B, E, or F. For example, the diffractive element 404 may be on the surface having the most optical power, here, surface E.

For the imaging lens 400, surface A is a gullwing surface having a clear aperture of 1.423 mm and SAG over the clear aperture of 0.017 mm (17 µm); surface B is a convex surface having a clear aperture of 1.716 mm and SAG over the clear aperture is 0.049 mm (49 µm); surface E is a convex surface having a clear aperture of 1.750 mm and SAG over the clear aperture is 0.054 mm (54 µm).

Thus, for the imaging lens 400, the maximum clear aperture is 1.75 mm, i.e., less than 30% greater than the sensor image diagonal (or than the image circle), and the maximum SAG is 54 µm, i.e., less than 100 µm. Further, in this particular example, the second optical element 420 is closer to the cover glass 132 than to the first optical element 410, with a difference between these distances, i.e., B to E and F to 132, being greater than 50%.

Figure 6:
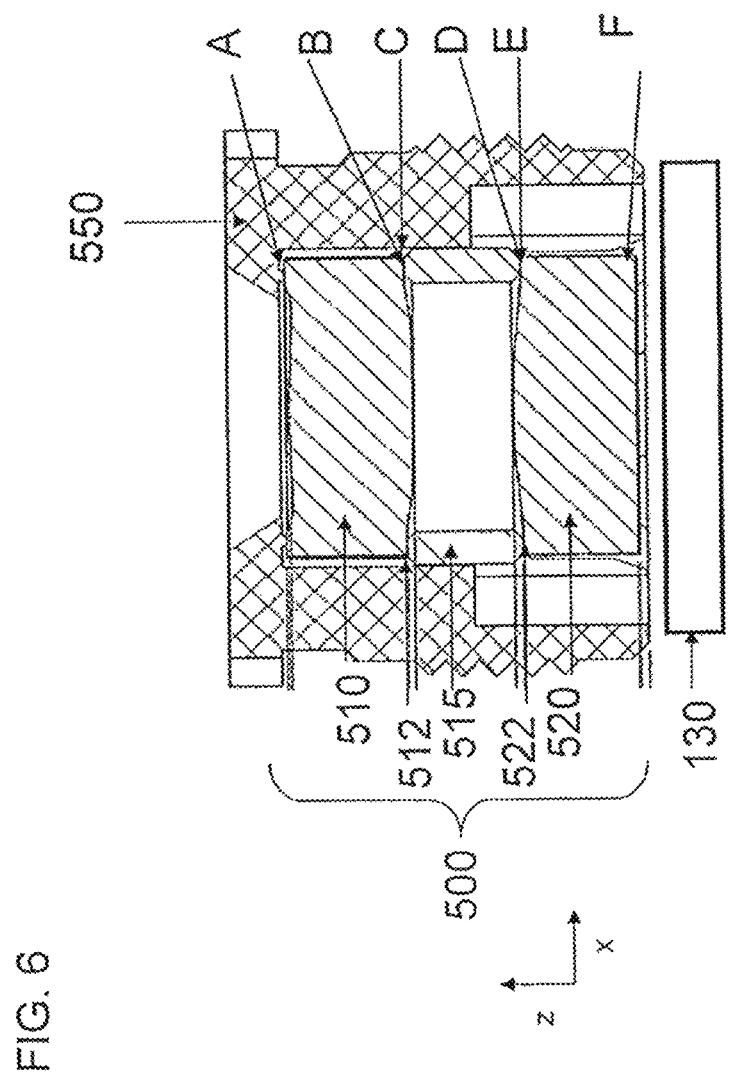
FIG. 6 illustrates a cross-sectional view of a module assembly including an imaging system in accordance with an embodiment.

Any of the imaging lenses 100, 200, 300, 400 discussed above may be provided in a barrel assembly 550, as illustrated in FIG. 6. In particular, the barrel assembly 550 may be a threaded barrel assembly such that a distance between an imaging lens 500 housed therein and the sensor 130, i.e., along the z-axis, may be altered. As illustrated therein, the imaging lens 500 may include a first optical element 510 and a second optical element 520 separated by a spacer 515 providing an air gap between surfaces B and E. The surfaces B and E may include relative planar portions 512, 522, i.e., flat regions, in a periphery thereof to facilitate securing of the spacer 515 thereto.

Embodiments described above may work with a particular image sensor diagonal of about 1.443 mm. This dimension may correspond to an exemplary sensor that includes a horizontal resolution of 60 pixels, a vertical resolution of 60 pixels and a pixel size or pixel pitch of approximately 17 µm. The teachings presented herein may be applied to imaging lens designs for use with sensors that include different image sensor diagonals. Certainly, as technology progresses, IR sensor sensitivity may increase and pixel sizes may decrease as exemplified by the reduction in size of visible image sensor pixels. Table I below lists some representative TIR sensors currently available or currently under development and for which the embodiments provided herein may be designed.

TABLE I

Representative TIR Image Sensor Specifications

| Horizontal Resolution (pix) | Vertical Resolution (pix) | Pixel Size (µm) | Image Diagonal (mm) |
|---|---|---|---|
| 320 | 240 | 25 | 10 |
| 320 | 240 | 17 | 6.8 |
| 320 | 240 | 10 | 4 |
| 160 | 120 | 25 | 5 |
| 160 | 120 | 17 | 3.4 |
| 160 | 120 | 10 | 2 |
| 80 | 60 | 25 | 2.5 |
| 80 | 60 | 17 | 1.7 |
| 80 | 60 | 10 | 1 |
| 60 | 60 | 25 | 2.121 |
| 60 | 60 | 17 | 1.4425 |
| 60 | 60 | 10 | 0.8485 |

FIG. 9 illustrates a schematic side view of an imaging capturing system 750 in the TIR waveband in accordance with an embodiment. As illustrated in FIG. 9, the image capturing system 750 includes an imaging lens 700 and the sensor 730. In this particular embodiment, the sensor 730 is characterized by a slightly larger image sensor diagonal of about 1.7 mm. Accordingly, the overall size of imaging lens 700 is slightly larger than imaging lenses 200, 300 and 400 described above.

The imaging lens 700 may include a first optical element 710 and a second optical element 720. In the schematic illustration of FIG. 9, a spacer (which would include surfaces C and D, see FIG. 6) between the first optical element 710 and the second optical element 720 has been omitted for clarity.

In this particular embodiment, three surfaces, here surfaces A, B, and E, have optical power therein. One, two, or all three surfaces may be aspheric. The imaging lens 700 may also include the aperture stop 702, which may have the same configuration/properties noted above for aperture stop 102. The f-number for the imaging lens 400 may be less than or about 1.1.

If the material used for one or both optical elements 710, 720 presents chromatic dispersion over an operational waveband or if the imaging lens 700 otherwise requires correction, a diffractive element 704 may be provided on one or more of the surfaces A, B, E, or F. For example, the diffractive element 704 may be on a surface having more optical power, for example surface A or surface E.

For the imaging lens 700, first optical element 710 includes a meniscus shape with the object side surface A being convex and the image side surface B being concave. Second optical element 720 includes a plano-convex shape with the object side surface E being convex and the image side surface F being planar. Surface A has positive power and surface B has negative power while the net effect of surfaces A and B combine to make optical element 710 positive overall. Surface E has positive power and optical element 720 is positive overall. Surface A includes a clear aperture of 1.395 mm and SAG over the clear aperture of 0.090 mm (90 µm). Surface B includes a clear aperture of 1.407 mm and SAG over the clear aperture is 0.077 mm (77 µm). Surface E includes a clear aperture of 1.950 mm and SAG over the clear aperture is 0.111 mm (111 µm). Thus, for the imaging lens 700, the maximum clear aperture is 1.95 mm, i.e., less than 30% greater than the sensor image diagonal (or than the image circle) of 1.7 mm, and the maximum SAG is 111 µm, which is slightly larger than 100 µm.

Notably, in each of the designs 200, 300, 400, 700, the largest sag corresponds to the same lens surface that includes the largest clear aperture. The ratio (or percentage) of largest sag to largest clear aperture of imaging lenses 200, 300, 400, and 700 may be calculated as 4.4%, 3.2%, 3.1%, and 5.7%, respectively. Thus, ratio of largest sag to largest clear aperture for all imaging lenses 200, 300, 400, and 700 is less than 10% and, in all instances, less than 6%. A relatively small ratio of the largest sag to largest clear aperture may be desirable in certain manufacturing methods, including those described in the "Method of Making" section below. Certainly smaller sags are desirable for many lens manufacturing techniques as it may limit the amount of material that is machined in masters or molds. However, there may be a practical lower limit on the ratio of largest sag to largest clear aperture as some amount of power might be desired in a given design.

Figure 10:
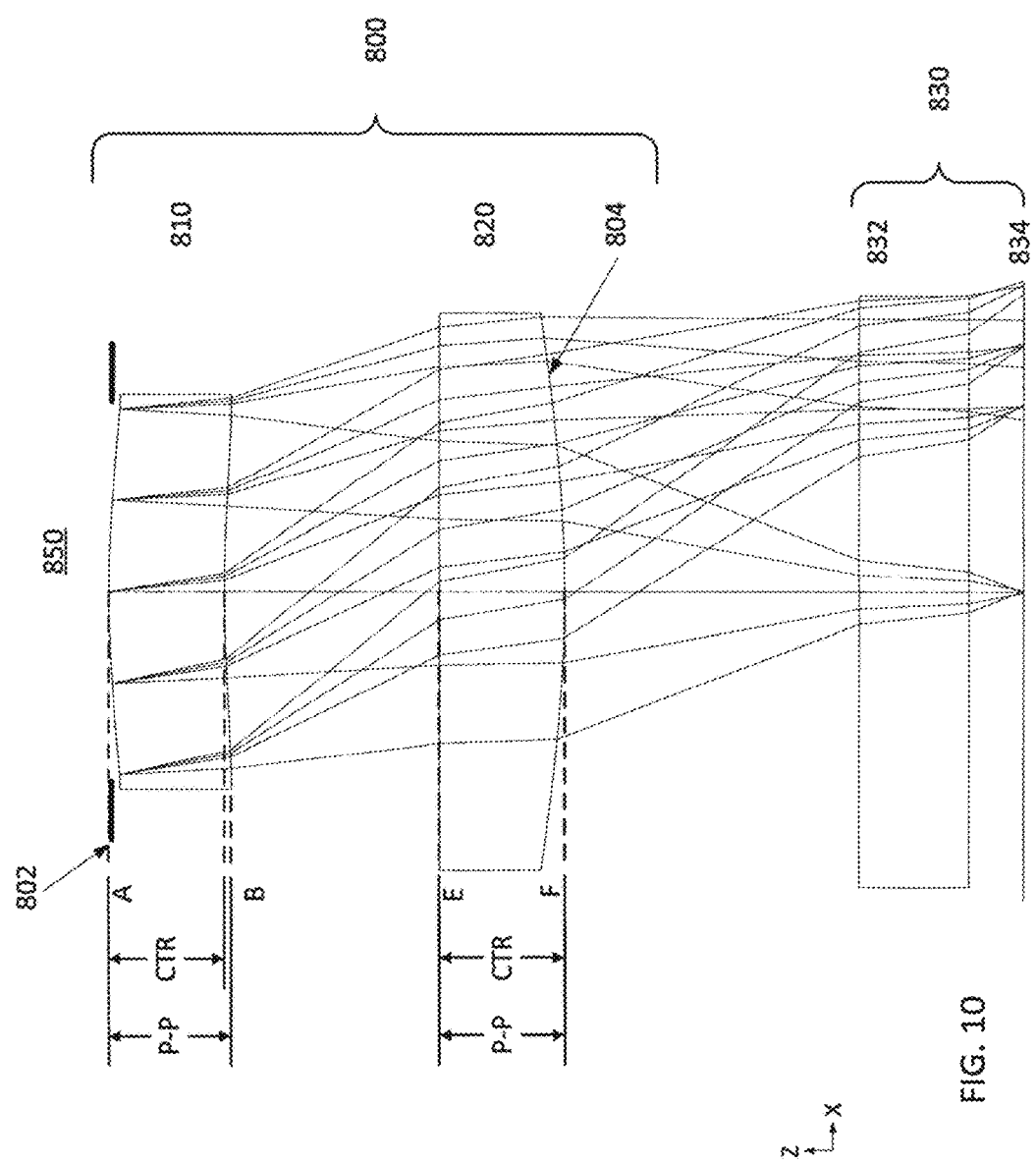
FIG. 10 illustrates a schematic side view of an image capturing system in accordance with an embodiment.

FIG. 10 illustrates a schematic side view of an imaging capturing system 850 in the TIR waveband in accordance with an embodiment. As illustrated in FIG. 10, the image capturing system 850 includes an imaging lens 800 and the sensor 830. In this particular embodiment, the sensor 830 is characterized by an even larger image sensor diagonal of about 3.4 mm. Accordingly, the overall size of imaging lens 800 is slightly larger than imaging lenses 200, 300, 400, and 700 described above.

The imaging lens 800 may include a first optical element 810 and a second optical element 820. In the schematic illustration of FIG. 10, a spacer (which would include surfaces C and D, see FIG. 6) between the first optical element 810 and the second optical element 820 has been omitted for clarity.

In this particular embodiment, three surfaces, here surfaces A, B, and F, have optical power therein. One, two, or all three surfaces may be aspheric. The imaging lens 800 may also include the aperture stop 802, which may have the same configuration/properties noted above for aperture stop 102. The f-number for the imaging lens 800 may be less than or about 1.4.

If the material used for one or both optical elements 810, 820 presents chromatic dispersion over an operational waveband or if the imaging lens 800 otherwise requires correction, a diffractive element 804 may be provided on one or more of the surfaces A, B, E, or F. For example, the diffractive element 804 may be on a surface having more optical power, for example surface A or surface F.

For the imaging lens 800, first optical element 810 includes a meniscus shape with the object side surface A being convex and the image side surface B being concave. Second optical element 820 includes a plano-convex shape with the object side surface E being planar and the image side surface F being convex. Surface A has positive power and surface B has negative power while the net effect of surfaces A and B combine to make optical element 810 positive overall. Surface F has positive power and optical element 820 is positive overall. Surface A includes a clear aperture of 1.999 mm and SAG over the clear aperture of 0.062 mm (62 µm). Surface B includes a clear aperture of 2.161 mm and SAG over the clear aperture is 0.037 mm (37 µm). Surface F includes a clear aperture of 3.045 mm and SAG over the clear aperture is 0.130 mm (130 µm). Thus, for the imaging lens 800, the maximum clear aperture is 3.045 mm, i.e., less than 30% greater than the sensor image diagonal (or than the image circle) of 3.4 mm, and the maximum SAG is 130 µm, which is 4.3% (i.e., less than 6%) of the largest clear aperture. As with imaging lenses 200, 300, 400, and 700, the largest clear aperture is on one surface of a plano-convex element 820.

As discussed above, it may be desirable in the case of wafer-based manufacturing to make the center thicknesses of the optical elements similar in size. In one example given above, optical elements 210 and 220 in imaging lens 200 include center thicknesses of 0.68 mm and 0.69 mm, respectively. In that particular example and in the case of the imaging lens 300 of FIG. 4 (center thicknesses of about 0.71 mm for each element 310, 320), the center thickness along the optical axis represents the thickest portion of the element. However, in the case of optical elements that include concave surfaces, the center thickness may not represent the thickest region of the optical element nor the largest thickness dimension of the element.

Referring once again to FIGS. 9 and 10, each of these imaging lenses 700, 800 include a concave surface B. In these examples, the center thickness does not reflect the thickest (along a direction parallel to the optical axis) region of the element. In FIGS. 9 and 10, optical elements 710 and 810 include a center thickness dimension labeled "CTR" and a peak-to-peak dimension labeled "P-P." The P-P dimension reflects a largest distance parallel to the optical axis between the highest opposing surfaces of the elements 710, 810 within their respective clear apertures. In each case, the P-P dimension is larger than the CTR thickness dimension. Note, however that for optical elements 720, 820, the P-P dimension and CTR dimension are the same.

Figure 11:
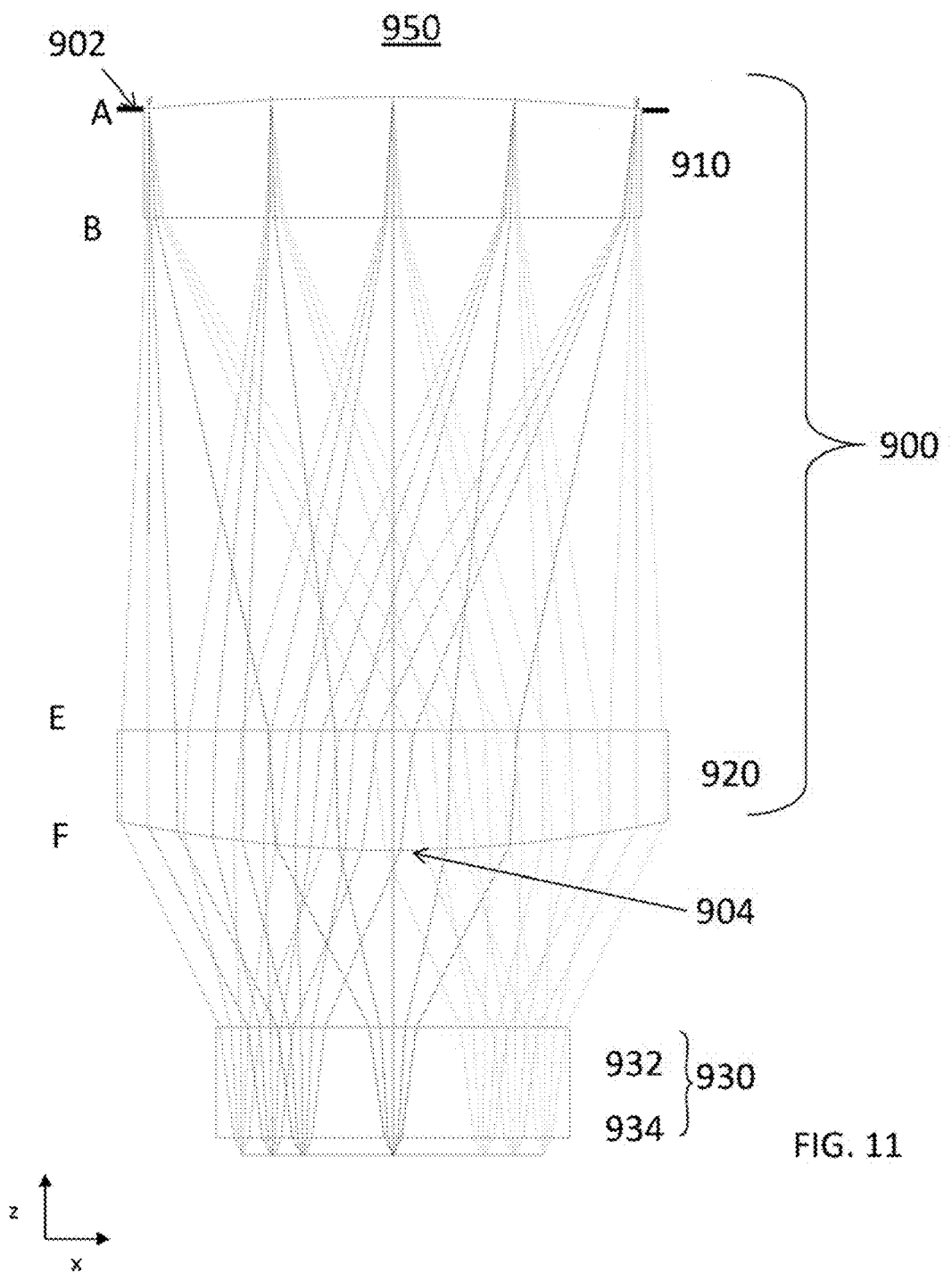
FIG. 11 illustrates a schematic side view of an image capturing system in accordance with an embodiment.

FIG. 11 illustrates a schematic side view of an imaging capturing system 950 in the TIR waveband in accordance with an embodiment. As illustrated in FIG. 11, the image capturing system 950 includes an imaging lens 900 and the sensor 930. The sensor 930 may include a sensor cover glass 932 and pixels in a sensor image plane 934. In this particular embodiment, the sensor 930 is characterized by a slightly larger image sensor diagonal of about 1.7 mm. Accordingly, the overall size of imaging lens 900 is slightly larger than imaging lenses 200, 300 and 400 described above.

In the schematic illustration of FIG. 11, a spacer (which would include surfaces C and D, see FIG. 6) between the first optical element 910 and the second optical element 920 has been omitted for clarity.

In this particular embodiment, two surfaces, here surfaces A and F, have optical power therein. One, two, or all three surfaces may be aspheric. The imaging lens 800 may also include an aperture stop 902, which may have the same configuration/properties noted above for aperture stop 202. The f-number for the imaging lens 400 may be less than or about 1.4.

If the material used for one or both optical elements 910, 920 presents chromatic dispersion over an operational waveband or if the imaging lens 900 otherwise requires correction, a diffractive element 904 may be provided on one or more of the surfaces A, B, E, or F. For example, the diffractive element 904 may be on a surface having more optical power, for example surface F.

For the imaging lens 900, the first and second optical elements 910, 920 are plano-covex elements, with the planar surfaces facing each other. In particular, first optical element 910 has a convex shape at the object side surface A and the second optical element 920 has a convex shape at the object side surface E being planar and the image side surface F being convex. Surfaces A and F have positive power. Surface A includes a clear aperture of 2.755 mm and SAG over the clear aperture of 0.064 mm (64 μm). Surface F includes a clear aperture of 3.111 mm and SAG over the clear aperture is 0.064 mm (64 μm). Thus, for the imaging lens 900, the maximum clear aperture is 3.111 mm, i.e., less than 30% greater than the sensor image diagonal (or than the image circle) of 3.4 mm, and the maximum SAG is 64 μm, which is 2.1% (i.e., less than 6%) of the largest clear aperture. As with imaging lenses 200, 300, 400, and 700, the largest clear aperture is on one surface of a plano-convex element 920.

Table II below includes relevant CTR and P-P dimensions for the imaging lenses 200, 300, 700, 800, 900 disclosed herein. Table II also includes a calculated percentage difference between the P-P thicknesses of the A-B element and the E-F element of each respective lens design.

TABLE II

Representative Optical Element Thicknesses

| Imaging Lens | A-B Element CTR Thickness | A-B Element P-P Thickness | E-F Element CTR Thickness | E-F Element P-P Thickness | P-P Difference Between Elements |
|---|---|---|---|---|---|
| 200 | 0.68 | 0.68 | 0.69 | 0.69 | 1% |
| 300 | 0.71 | 0.71 | 0.72 | 0.72 | 1% |
| 700 | 0.60 | 0.68 | 0.69 | 0.69 | 1% |
| 800 | 0.62 | 0.66 | 0.68 | 0.68 | 3% |
| 900 | 0.68 | 0.68 | 0.625 | 0.625 | 9% |

An advantage of wafer-based manufacturing techniques is that they may yield thinner optical elements than other methods. Further, the high index nature of the optical materials disclosed herein may permit smaller sags and shallower lens curves. One method of quantifying these characteristics is to compare (as a percentage) the sag of a particular powered surface of the imaging lens to the overall maximum (P-P) thickness of the optical element on which that powered surface lies. Another method compares (again as a percentage) the overall maximum (P-P) thickness of an optical element to the clear aperture size of a given powered surfaces on that particular element. Both of these quantities are shown in the table below for the same imaging lenses 200, 300, 700, 800 included in Table II. Specifically, Table III provides the following dimension ratios (represented as percentages):

Ratio A—The overall maximum (P-P) thickness of optical element A-B to the maximum clear aperture of surface A Ratio B—The overall maximum (P-P) thickness of optical element A-B to the maximum clear aperture of surface B Ratio C—The overall maximum (P-P) thickness of optical element A-B to the maximum clear aperture of surface E or F (whichever is powered)

Ratio D—Sag of surface A of the imaging lens to the overall maximum (P-P) thickness of optical element A-B Ratio E—Sag of surface B of the imaging lens to the overall maximum (P-P) thickness of optical element A-B Ratio F—Sag of surface E or F (whichever is powered) of the imaging lens to the overall maximum (P-P) thickness of optical element E-F

TABLE III

Representative Dimensions of Imaging Lenses

| Imaging Lens | Ratio A | Ratio B | Ratio C | Ratio D | Ratio E | Ratio F |
|---|---|---|---|---|---|---|
| 200 | 58.7% | 47.5% | 42.8% | 1.2% | 6.2% | 10.3% |
| 300 | 60.8% | 50.8% | 49.9% | 2.4% | 5.5% | 6.4% |
| 700 | 48.7% | 48.3% | 35.4% | 13.2% | 11.3% | 16.1% |
| 800 | 33.0% | 30.5% | 22.3% | 9.4% | 5.6% | 19.1% |
| 900 | 25.3% | 21.7% | 21.9% | 9.4% | 0% | 9.4% |

Notably, the numbers shown in the Ratio A, B, and C columns reveal that a significant advantage of wafer-based manufacturing techniques appears as image sensors (and hence, clear apertures) grow in size as in the case of imaging lenses 700, 800, and 900. In those particular imaging lenses, the overall maximum P-P thickness of each of the optical elements in imaging lenses 700, 800, and 900 is less than about 50% of the clear aperture size of the powered surfaces on those optical elements. In the case of the larger of the imaging lenses 800 and 900, that ratio is less than about 35% for all powered surfaces.

Another notable aspect of the ratios D, E, and F provided in Table III is that the ratio of sag of a particular powered surface of the imaging lens to the overall maximum (P-P) thickness of the optical element on which that powered surface lies is less than about 30%. More specifically, for the imaging lenses provided in Table III, this ratio is less than about 20%.

The tables below provide exemplary details on the depicted embodiments of imaging lenses 700, 800, 900, and others. Table IV includes General Lens Data for imaging lens 700. Table V provides Surface Data for surfaces A, B, E, and F of imaging lens 700. Table VI provides details relating to aspheric coefficients of known even aspheric equations used to describe aspheric lens surfaces (e.g., surfaces A, B, E of imaging lens 700) and can be analyzed using available software such as ZEMAX or CODE V. Tables VII, VIII, and IX present similar data for imaging lens 800.

TABLE IV

General Lens Data For Imaging Lens 700

| | |
|---|---|
| Surfaces | 8 |
| Stop | 2 |
| System Aperture | Float By Stop Size = 0.6976 |
| Apodization | Uniform, factor = 0 |
| Temperature (C.) | 20 |
| Pressure (ATM) | 1 |
| Effective Focal Length | 1.6010 |
| Back Focal Length | 0.1971 |
| Total Track | 3.2047 |
| Image Space F/# | 1.1476 |
| Paraxial Working F/# | 1.1476 |
| Working F/# | 1.1009 |
| Image Space NA | 0.3994 |
| Stop Radius | 0.6976 |
| Paraxial Image Height | 0.8500 |
| Paraxial Magnification | 0.0000 |
| Entrance Pupil Diameter | 1.3951 |
| Entrance Pupil Position | 0.0000 |
| Exit Pupil Diameter | 2.3749 |
| Exit Pupil Position | −2.6293 |
| Field Type | Real Image height in Millimeters |
| Maximum Radial Field | 0.85 |
| Primary Wavelength | 10.5 μm |
| Lens Units | Millimeters |
| Angular Magnification | 0.5875 |

TABLE V

Surface Data For Imaging Lens 700

| Surface | Type | Radius | Thickness | Material | Diameter | Conic | Note |
|---|---|---|---|---|---|---|---|
| OBJ | STANDARD | Inf. | Infinity | | 0.000 | 0 | |
| 1 | STANDARD | Inf. | 1.543 | | 0.000 | 0 | |
| STO | EVENASPH | Inf. | 0.604 | SILICON | 1.395 | 0 | Surface A |
| 3 | EVENASPH | Inf. | 0.659 | | 1.407 | 0 | Surface B |
| 4 | EVENASPH | Inf. | 0.690 | SILICON | 1.950 | 0 | Surface E |
| 5 | EVENASPH | Inf. | 0.526 | | 1.898 | 0 | Surface F |
| 6 | STANDARD | Inf. | 0.50-0.75 | SILICON | 1.735 | 0 | Cover |
| 7 | STANDARD | Inf. | 0.101 | | 1.693 | 0 | |
| IMA | STANDARD | Inf. | | | 1.665 | 0 | |

TABLE VI

Asphere Coefficients For Elements 710 and 720 of Imaging Lens 700

| | |
|---|---|
| Surface STO EVENASPH | |
| Coefficient on $r\char`\^2$ | 0.20792788 |
| Coefficient on $r\char`\^4$ | −0.10368648 |
| Coefficient on $r\char`\^6$ | 0.28308973 |
| Coefficient on $r\char`\^8$ | −0.35822562 |
| Coefficient on $r\char`\^{10}$ | −0.22014559 |
| Coefficient on $r\char`\^{12}$ | 0.52411507 |
| Coefficient on $r\char`\^{14}$ | 0 |
| Coefficient on $r\char`\^{16}$ | 0 |
| Aperture | Floating Aperture |
| Maximum Radius | 0.69755287 |
| Surface 3 EVENASPH | |
| Coefficient on $r\char`\^2$ | 0.20298147 |
| Coefficient on $r\char`\^4$ | −0.41026658 |
| Coefficient on $r\char`\^6$ | 2.9954506 |
| Coefficient on $r\char`\^8$ | −13.711652 |
| Coefficient on $r\char`\^{10}$ | 35.014635 |
| Coefficient on $r\char`\^{12}$ | −47.46132 |
| Coefficient on $r\char`\^{14}$ | 26.660403 |
| Coefficient on $r\char`\^{16}$ | 0 |
| Surface 4 EVENASPH | |
| Coefficient on $r\char`\^2$ | 0.12748631 |
| Coefficient on $r\char`\^4$ | 0.065277268 |
| Coefficient on $r^6$ | −0.50553199 |
| Coefficient on $r^8$ | 1.477785 |
| Coefficient on $r^{10}$ | −2.2472389 |
| Coefficient on $r^{12}$ | 1.8033722 |
| Coefficient on $r^{14}$ | −0.71809312 |
| Coefficient on $r^{16}$ | 0.11408192 |

TABLE VII

General Lens Data For Imaging Lens 800

| | |
|---|---|
| Surfaces | 8 |
| Stop | 2 |
| System Aperture | Float By Stop Size = 0.999359 |
| Apodization | Uniform, factor = 0 |
| Temperature (C.) | 20 |
| Pressure (ATM) | 1 |
| Effective Focal Length | 2.8243 |
| Back Focal Length | 0.4205 |
| Total Track | 4.9353 |
| Image Space F/# | 1.4131 |
| Paraxial Working F/# | 1.4131 |
| Working F/# | 1.3843 |
| Image Space NA | 0.3336 |
| Stop radius | 0.9994 |
| Paraxial Image Height | 1.7000 |
| Paraxial Magnification | 0.0000 |
| Entrance Pupil Diameter | 1.9987 |
| Entrance Pupil Position | 0.0000 |
| Exit Pupil Diameter | 3.5495 |
| Exit Pupil Position | −4.8951 |
| Field Type | Real Image height in Millimeters |
| Maximum Radial Field | 1.7 |
| Primary Wavelength | 10.5 μm |
| Lens Units | Millimeters |
| Angular Magnification | 0.5631053 |

TABLE VIII

Surface Data For Imaging Lens 800

| Surface | Type | Radius | Thickness | Material | Diameter | Conic | Note |
|---|---|---|---|---|---|---|---|
| OBJ | STANDARD | Inf. | Infinity | | 0.000 | 0 | |
| 1 | STANDARD | Inf. | 0.000 | | 2.121 | 0 | |
| STO | EVENASPH | Inf. | 0.624 | SILICON | 1.999 | 0 | Surface A |
| 3 | EVENASPH | Inf. | 1.143 | | 2.161 | 0 | Surface B |
| 4 | EVENASPH | Inf. | 0.680 | SILICON | 2.937 | 0 | Surface E |
| 5 | EVENASPH | Inf. | 1.588 | | 3.045 | 0 | Surface F |
| 6 | STANDARD | Inf. | 0.50–0.75 | SILICON | 3.166 | 0 | Cover |
| 7 | STANDARD | Inf. | 0.300 | | 3.235 | 0 | |
| IMA | STANDARD | Inf. | | | 3.379 | 0 | |

TABLE IX

Asphere Coefficients For Elements 810 and 820 of Imaging Lens 800

| Surface STO EVENASPH | |
|---|---|
| Coefficient on $r^2$ | 0.078891323 |
| Coefficient on $r^4$ | −0.012321811 |
| Coefficient on $r^6$ | −0.004856381 |
| Coefficient on $r^8$ | −0.000119317 |
| Coefficient on $r^{10}$ | 0.000200377 |
| Coefficient on $r^{12}$ | 0 |
| Coefficient on $r^{14}$ | 0 |
| Coefficient on $r^{16}$ | 0 |
| Aperture | Floating Aperture |
| Maximum Radius | 0.99935902 |
| Surface 3 EVENASPH | |
| Coefficient on $r^2$ | 0.058798864 |
| Coefficient on $r^4$ | −0.021036329 |
| Coefficient on $r^6$ | −0.008045456 |
| Coefficient on $r^8$ | 0.016800284 |
| Coefficient on $r^{10}$ | −0.009958394 |
| Coefficient on $r^{12}$ | 0 |
| Coefficient on $r^{14}$ | 0 |
| Coefficient on $r^{16}$ | 0 |
| Surface 5 EVENASPH | |
| Coefficient on $r^2$ | −0.063406934 |
| Coefficient on $r^4$ | 0.002492598 |
| Coefficient on $r^6$ | 0.000466197 |
| Coefficient on $r^8$ | −0.00020842 |
| Coefficient on $r^{10}$ | 6.15E−05 |
| Coefficient on $r^{12}$ | 0 |
| Coefficient on $r^{14}$ | 0 |
| Coefficient on $r^{16}$ | 0 |

TABLE X

General Lens Data For Imaging Lens 900

| | |
|---|---|
| Surfaces | 8 |
| Stop | 2 |
| System Aperture | Float By Stop Size = 1.37726 |
| Apodization | Uniform, factor = 0 |
| Temperature (C.) | 20 |
| Pressure (ATM) | 1 |
| Effective Focal Length | 3.009397 |
| Back Focal Length | 0.1251376 |
| Total Track | 6.000279 |
| Image Space F/# | 1.092527 |
| Paraxial Working F/# | 1.092527 |
| Working F/# | 1.094175 |
| Image Space NA | 0.4161447 |
| Stop Radius | 1.377265 |
| Paraxial Image Height | 0.85 |
| Paraxial Magnification | 0.0000 |
| Entrance Pupil Diameter | 2.754529 |
| Entrance Pupil Position | 0.0000 |
| Exit Pupil Diameter | 11.89146 |
| Exit Pupil Position | 13.01588 |
| Field Type | Real Image height in Millimeters |
| Maximum Radial Field | 0.85 |
| Primary Wavelength | 10.5 μm |
| Lens Units | Millimeters |
| Angular Magnification | −0.2316557 |

TABLE XI

Surface Data For Imaging Lens 900

| Surface | Type | Radius | Thickness | Material | Diameter | Conic | Note |
|---|---|---|---|---|---|---|---|
| OBJ | STANDARD | Inf. | Infinity | | 0.000 | 0 | |
| 1 | STANDARD | Inf. | 0.000 | | 2.829748 | 0 | |
| STO | EVENASPH | Inf. | 0.68 | SILICON | 2.754529 | 0 | Surface A |
| 3 | EVENASPH | Inf. | 2.914433 | | 2.8121 | 0 | Surface B |
| 4 | EVENASPH | Inf. | 0.680 | SILICON | 3.096479 | 0 | Surface E |
| 5 | EVENASPH | Inf. | 0.9998465 | | 3.111283 | 0 | Surface F |
| 6 | STANDARD | Inf. | 0.50–0.75 | SILICON | 1.995771 | 0 | Cover |
| 7 | STANDARD | Inf. | 0.101 | | 1.83606 | 0 | |
| IMA | STANDARD | Inf. | | | 1.7 | 0 | |

TABLE XII

Asphere Coefficients For Elements
910 and 920 of Imaging Lens 900

Surface STO EVENASPH

| | |
|---|---|
| Coefficient on $r^2$ | 0.035302375 |
| Coefficient on $r^4$ | −0.00073607116 |
| Coefficient on $r^6$ | −4.3193951e−005 |
| Coefficient on $r^8$ | −0.000119317 |
| Coefficient on $r^{10}$ | 0.000200377 |
| Coefficient on $r^{12}$ | 0 |
| Coefficient on $r^{14}$ | 0 |
| Coefficient on $r^{16}$ | 0 |
| Aperture | Floating Aperture |
| Maximum Radius | 1.3772646 |

Surface 5 EVENASPH

| | |
|---|---|
| Coefficient on $r^2$ | −0.076900871 |
| Coefficient on $r^4$ | 0.0048129308 |
| Coefficient on $r^6$ | −0.00048939725 |
| Coefficient on $r^8$ | 0 |
| Coefficient on $r^{10}$ | 0 |
| Coefficient on $r^{12}$ | 0 |
| Coefficient on $r^{14}$ | 0 |
| Coefficient on $r^{16}$ | 0 |

Method of Making

Figure 14A:
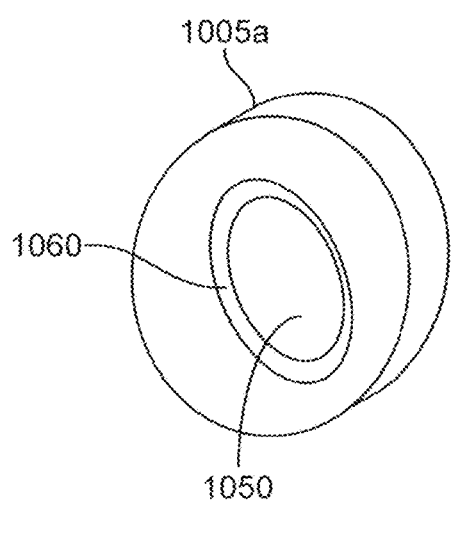
Figure 14B:
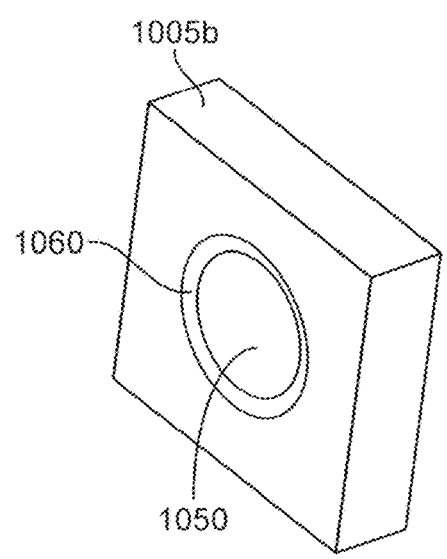

One or both of the optical elements noted above may be silicon. Any one, two, or all of the lens surfaces noted above may be made using, e.g., the stamp and transfer technique disclosed in U.S. Pat. No. 6,027,595, which is hereby incorporated by reference in its entirety. As noted therein, these surfaces may be created on the wafer level, i.e., a plurality of these surfaces may be replicated and transferred to a wafer simultaneously and later singulated to realize individual optical elements. When fabricated on a wafer level, singulation may result in a circular, as shown in FIG. 14A, or non-circular, e.g., polygonal, die, as shown in FIG. 14B. However, such techniques may not allow ready realization of more complicated lens shapes, e.g., aspheric lenses. Depending on the material of the optical element, other techniques for forming one or more of the lens surfaces may include diamond turning or molding, e.g., high temperature molding.

As another alternative to creating the imaging systems described above, a method illustrated in FIG. 12 may be employed. In operation S10, a wafer-level master may be created. The wafer-level master may be formed by diamond turning a metal master, e.g., a nickel plated master. The wafer-level master may have the desired lens profiles, or a perturbed form of the desired lens profiles, therein.

Figure 12:
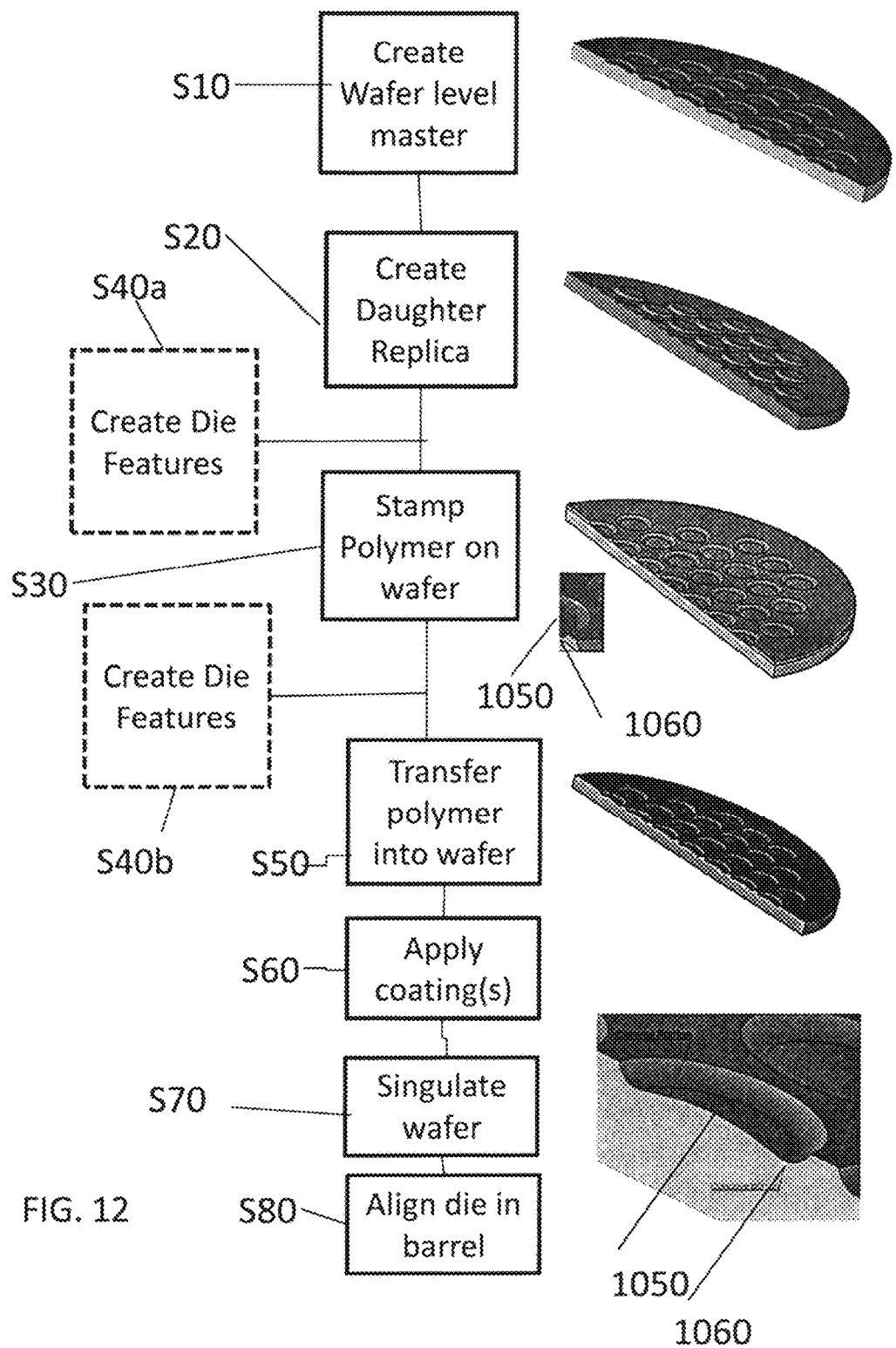
FIG. 12 illustrates a flow chart for making an optical element in accordance with an embodiment, along with perspective sectional views of devices at respective stages.
Figure 13:
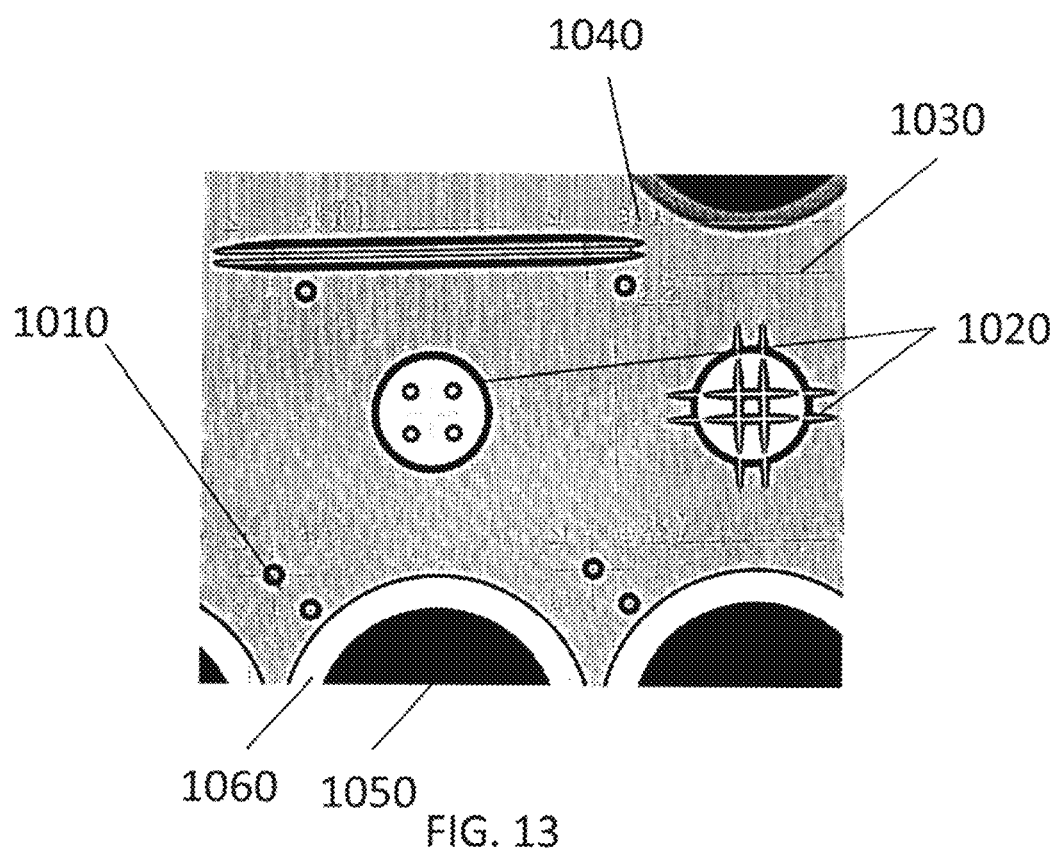
FIG. 13 illustrates a top view of a wafer having die features thereon.

Due to the nature of the diamond turning process, in which the metal is shaped with a diamond tool that has a finite well defined radius of curvature, the convex lens shapes 1050 have a transitional concave blend zone 1060 around the clear aperture, as may be seen in the enlarged view of FIG. 12 and in FIG. 13. Similarly, concave lens shapes may have a transitional convex blend zone around the clear aperture. In order to maintain reasonable cut speeds and process durability the diamond tools typically have radii of curvatures greater than 100 micrometers, which will result in the blend zone with comparable dimensions. This blend zone may be a continuous blend region of a concave or convex portion with a curvature of less than 10 microns terminating to a flat field, i.e., slope of zero degrees. The flat field may be higher than the lowest point of the lens or blend zone.

In addition, diamond turning of metals can result in very fine surface finish with typical roughness average (Ra) values less than 20 nm, e.g., 10 nm. In contrast, diamond turning a silicon substrate results in reduced surface finish quality, typically having roughness values no better than around 40 nm Ra.

In operation S20, a daughter replica is formed. The wafer-level master may be used to form numerous daughter replicas. The daughter replicas will have negative shapes of the desired lenses. The daughter replica serves as a replication stamp for generating polymer lens shapes on Si substrate. Forming the daughter replica may include overmolding the metal master using a thermoset or UV curable polymer which is applied onto the surface of the master in the form of liquid and undergoes a phase transition once exposed to an elevated temperatures or ultraviolet radiation. Such an operation results in a conformity in transferring the diamond turned surface of the metal master into the stamp polymer surface which results in Ra values as small as the one of the diamond turned surface of the master or even lower.

In operation S30, the stamp, which has negative shapes of the desired lenses, is used to cast polymer lens shapes onto a Si substrate to create lens shapes of the same polarity (convex) as in the metal master. Similar to that explained above, the surface finish of such a polymer lens is comparable to that of the master and the stamp.

Die features, which include alignment marks for use in machine vision assembly, individual die identifiers, and a precise mechanical edge, may be formed before or after the stamping the replica. Thus, each die can include unique features that are not on the wafer-level master. Alternatively, these features could be provided, e.g., machined, laser scribed, lithographically created, or otherwise formed, on the wafer-level master itself. Examples of die features are illustrated in FIG. 13. As can be seen therein, these die feature may include alignment marks, e.g., die alignment marks 1010 and wafer alignment marks 1020, precise mechanical edges 1030, and die identifiers 1040.

In operation S40a, before stamping the polymer, die features may be patterned in photoresist on the substrate. Then, the polymer may be provided between the daughter and the substrate, i.e., the photoresist die features may be overmolded, and then, in operation S50, both the die features and the lens shapes may be transferred into the wafer.

In operation S40b, after replicating, a hard mask, e.g., chromium (Cr) would be deposited on the replicated surface. The hard mask would then be coated and patterned using standard positive resist lithography processing. The mask design would be such that the clear apertures of the lenses are protected and die features are patterned. After developing the resist and etching the hard mask expose the replicated polymer. This polymer will then be plasma etched in a highly selective chemistry not etching the hard mask and stopping once the silicon is exposed. Finally the resist and hard mask will be stripped leaving the patterned polymer ready to be transfer etched into the substrate, including the lens shapes and die features.

In operation S50, the polymer lens shapes and the die features are transferred into the bulk of the Si substrate, e.g., by plasma etch process. Due to the fact that the etching of both polymer and silicon is mainly atomic level chemical process there is no degradation in the surface finish of the resultant etched lenses. If there are to be features on the other side of the substrate, the process may begin again. Through processes S20, S30 and S50, material shrinkage in polymeric materials as well as imperfect anisotropy in the transfer process will often result in finite changes in the desired lens shape. The nature of these changes may characterized and the initial lens shape machined into the wafer-level master can be perturbed to compensate for these known process-induced changes. The resulting wafer-level lenses after step S50 are thus substantially closer to the target prescription.

In operation S60, a coating, e.g., an anti-reflective coating or a long pass filter that filters out short and/or mid-range infrared wavelengths, e.g., between 1.1 and 5 microns, e.g., 1.1 to 2 microns, may be provided on the wafer. For example, such a coating may be provided on both sides of the substrate, even if both sides do not have an optical element or other features thereon.

In operation S70, the substrate may be singulated to create multiple individual dies. If the surface is to have an aperture stop thereon, this aperture stop may be provided on top of the coating before singulation. Such singulation may include etching, dicing, scribe and break, and so forth. When using etching, a die having any desired shape, e.g., circular, may be realized. Such singulation by etching may be realized using Plasma-Therm's MDS-100. While etching may be more expensive than dice or scribe and break, etching may be more precise, and later assembly of a circular dies may be simpler, edge defects may be minimized or eliminated, and readily available barrels and more accurate alignment in barrels may be employed. When using etching, precise mechanical edges 1030 may not be needed, as the die edges may be defect free.

In operation S70, as illustrated in FIG. 6, these singulated dies may be provided in a cylindrical barrel.

FIG. 13 illustrates a top view of substrate having die features thereon.

Figure 15:
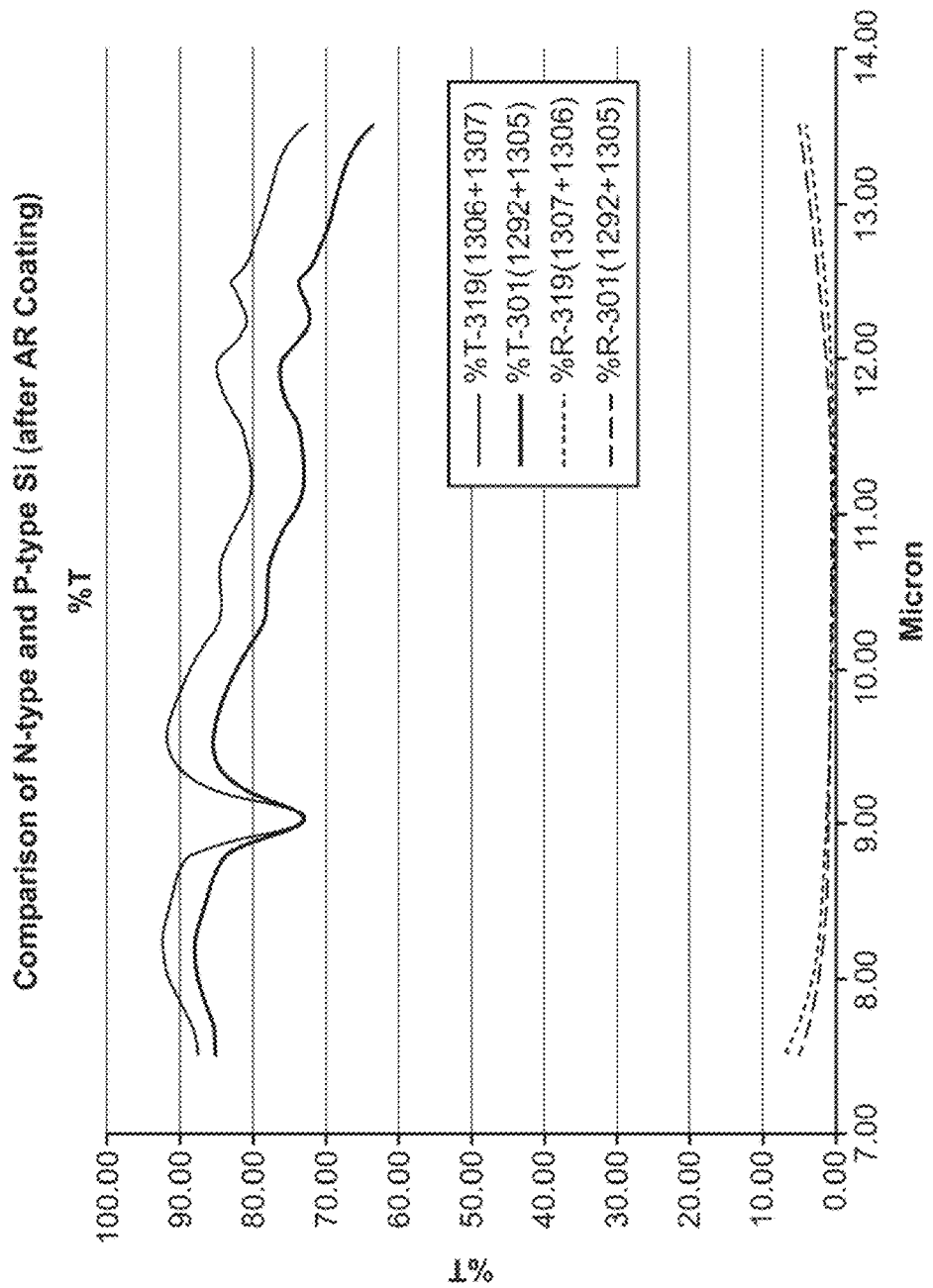
FIG. 15 illustrates a plot of wavelength versus transmission for silicon having different resistivities.

In using silicon to create the lenses used for TIR applications, measuring and controlling for the resistivity of the silicon may aid in realizing higher yields. In particular, in the TIR band, there are tradeoffs between transmission, for which low resistivity is good, and etch uniformity, for which high resistivity is preferred. Using silicon with a resistivity in a range, e.g., 0.1 Ωcm to 100 Ωcm, e.g., 1-10 Ωcm, both transmission and manufacturability of TIR lenses may be improved. Further, n-type and p-type silicon behave differently with respect to doping and transmission, with n-type silicon having better transmission at a given resistivity. This is illustrated in FIG. 15, in which the wafers each have a 2 Ωcm resistivity.

In addition to fabrication of surfaces on a wafer level, as disclosed in U.S. Pat. No. 6,096,155, which is hereby incorporated by reference in its entirety, two or more wafers, each having a plurality of optical elements thereon may be secured together along the z-direction before singulation, such that individual optical systems each have an optical element from each wafer. A spacer wafer may be provided between the two wafers having the optical elements thereon. Alternatively, one of the wafers having optical elements thereon and the spacer wafer may be secured and singulated, and then secured to another wafer having optical elements thereon, or one of the wafers having optical elements thereon may have spacers die bonded thereon and then secured to the other wafer having optical elements thereon.

In some embodiments, optical elements may be configured for use with TIR image sensors that are sensitive to wavelengths outside of the operational TIR band. For example, certain TIR image sensors might also detect energy in adjacent SWIR wavelength bands. In some instances, improved imaging performance in the TIR operational band may be achieved if one or more surfaces in the imaging lens include filter coatings, anti-reflection coatings, and the like. Additionally, when only LWIR or MWIR is to be detected, these wavelengths outside the waveband of interest may be filtered out. For example, certain surfaces of the optical elements that are planar (e.g., not molded or etched) may be easily processed with optical coatings. Certainly, filtering and anti-reflection coatings may be applied and may be desirable on powered surfaces as well.

Further, while the above designs used all silicon lenses, a silicon lens could be used in conjunction with a more traditional material for TIR imaging. Additionally, while the above methods are directed to wafer level manufacturing that result in circular or non-circular dies, a wafer level created die could be used with a discretely manufactured lens.

Devices Incorporating TIR Imaging Lens

Figure 8:
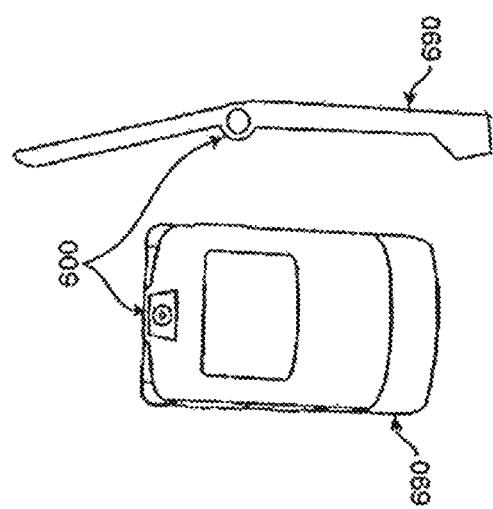
FIG. 8 illustrates a schematic perspective view of a mobile device incorporating an image capturing device in accordance with embodiments.
Figure 7:
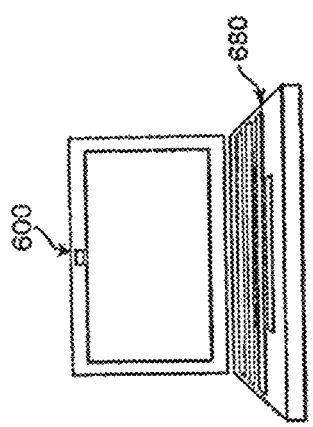
FIG. 7 illustrates a schematic perspective view of a computer incorporating an image capturing device in accordance with embodiments.

FIG. 7 illustrates a perspective view of a computer 680 having an TIR imaging system 600 integrated therein. FIG. 8 illustrates a front and side view of a mobile telephone 690 having the TIR imaging system 600 integrated therein. Of course, the TIR imaging system 600 may be integrated at other locations and with other electronic devices, e.g., mobile devices, entertainment systems, standalone thermal imagers, and so forth, other than those shown. The TIR imaging system 600 may be any of those noted above.

As used herein, the term "and/or" includes any and all combinations of one or more of the associated listed items. Further, although terms such as "first," "second," "third," etc., may be used herein to describe various elements, components, regions, layers and/or sections, these elements, components, regions, layers and/or sections should not be limited by these terms. These terms are only used to distinguish one element, component, region, layer and/or section from another. Thus, a first element, component, region, layer and/or section could be termed a second element, component, region, layer and/or section without departing from the teachings of the embodiments described herein.

Spatially relative terms, such as "beneath," "below," "lower," "above," "upper," etc., may be used herein for ease of description to describe the relationship of one element or feature to another element(s) or feature(s), as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

As used herein, the singular forms "a," "an" and "the" are intended to include the plural forms as well, unless the context clearly indicates otherwise. It will be further understood that the terms "comprises," "comprising," "includes," and "including" specify the presence of stated features, integers, steps, operations, elements, components, etc., but do not preclude the presence or addition thereto of one or more other features, integers, steps, operations, elements, components, groups, etc.

Embodiments of the present invention have been disclosed herein and, although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the present invention as set forth in the following claims.

What is claimed is:

1. A method of manufacturing lenses, the method comprising:
   creating a wafer-level master;
   overmolding the wafer-level master to form a daughter replica;
   casting a polymer lens shapes onto a silicon wafer having a resistivity between 0.1 and 100 Ωm using the daughter replica;
   transferring the polymer lens shapes into the wafer; and
   singulating the wafer to create individual dies with a lens thereon.

2. The method as claimed in claim 1, wherein creating the wafer-level master includes machining a metal substrate.

3. The method as claimed in claim 2, wherein machining includes diamond turning.

4. The method as claimed in claim 2, wherein creating the wafer-level master includes machining perturbed lens shapes into the wafer-level master such that the transferred lens shape in silicon best meets a desired lens shape.

5. The method as claimed in claim 1, further comprising, before singulating, forming die features on the wafer, at least one die feature being on the individual die.

6. The method as claimed in claim 5, wherein the die features include at least one of a die alignment mark, a wafer alignment mark, and a die identifier.

7. The method as claimed in claim 5, further comprising, before casting the polymer lens shapes, patterning die features in photoresist on a surface of the wafer to have polymer lens shapes cast thereon.

8. The method as claimed in claim 7, further comprising transferring the die features into the wafer.

9. The method as claimed in claim 8, wherein transferring the die features occurs during transferring the polymer lens shapes.

10. The method as claimed in claim 5, further comprising, after casting the polymer lens shapes and before transferring, patterning die features on a surface of the wafer having the polymer lens shapes thereon.

11. The method as claimed in claim 10, wherein patterning includes:
   depositing a hard mask on the surface of the wafer; and
   patterning the hard mask.

12. The method as claimed in claim 11, wherein patterning includes providing a photoresist pattern on the hard mask and etching the hard mask.

13. The method as claimed in claim 12, further comprising removing polymer while not affecting the hard mask until the wafer is exposed.

14. The method as claimed in claim 13, further comprising removing the hard mask and the photoresist.

15. The method as claimed in claim 1, wherein singulating includes etching.

16. The method as claimed in claim 1, further comprising, after transferring but before singulating, providing a coating on the wafer.

17. The method as claimed in claim 16, wherein the coating is one of an antireflective coating and a short wave cut filter.

18. The method as claimed in claim 16, wherein coating includes coating both surfaces of the wafer.

19. The method as claimed in claim 16, further comprising, after providing the coating and before singulating, forming aperture stops on the lenses.

20. The method as claimed in claim 19, wherein forming aperture stops includes patterning chrome.

21. The method as claimed in claim 1, further comprising, before casting, measuring a resistivity of the wafer.

22. The method as claimed in claim 1, continuing the method when the wafer has a resistivity between 1 and 10 Ωm.

23. The method as claimed in claim 1, further comprising, before singulating, forming aperture stops on the lenses.

24. The method as claimed in claim 1, wherein singulating creates circular dies.

25. The method as claimed in claim 1, wherein singulating creates non-circular dies.

* * * * *